United States Patent

Iwasaki et al.

[11] Patent Number: 5,950,776
[45] Date of Patent: Sep. 14, 1999

[54] APPARATUS AND METHOD FOR CONTROLLING DAMPING FORCE CHARACTERISTIC OF VEHICULAR SHOCK ABSORBER

[75] Inventors: Katsuya Iwasaki; Mitsuo Sasaki, both of Atsugi, Japan

[73] Assignee: Unisia Jecs Corporation, Atsugi, Japan

[21] Appl. No.: 09/126,415

[22] Filed: Jul. 30, 1998

Related U.S. Application Data

[62] Division of application No. 08/794,053, Feb. 4, 1997, Pat. No. 5,810,384, which is a continuation of application No. 08/358,745, Dec. 19, 1994, abandoned.

[30] Foreign Application Priority Data

Dec. 21, 1993 [JP] Japan ................................. 5-321571
Dec. 28, 1993 [JP] Japan ................................. 5-335156
Feb. 28, 1994 [JP] Japan ................................. 6-29299

[51] Int. Cl.$^6$ ........................................ F16F 9/46
[52] U.S. Cl. ................. 188/299; 188/319; 188/322.15; 280/5.515; 280/707; 280/714; 137/599.2; 251/129.15
[58] Field of Search .................. 280/698, 702, 280/707, 709, 710, 714, 755, 6.11, DIG. 1; 701/37, 38

[56] References Cited

U.S. PATENT DOCUMENTS

| | | | |
|---|---|---|---|
| 4,402,527 | 9/1983 | Kakehi et al. | 280/707 |
| 4,813,705 | 3/1989 | Hagen et al. | 280/707 |
| 4,854,429 | 8/1989 | Casey | 280/714 |
| 5,328,202 | 7/1994 | Kakizaki | 280/707 |
| 5,365,432 | 11/1994 | Kakizaki et al. | 364/424.05 |

FOREIGN PATENT DOCUMENTS

| | | |
|---|---|---|
| 0 166 313 | 1/1986 | European Pat. Off. . |
| 0 266 749 | 5/1988 | European Pat. Off. . |
| 0 616 912 | 9/1994 | European Pat. Off. . |
| 36 40 152 A1 | 11/1988 | Germany . |
| 41 39 690 | 6/1992 | Germany . |
| 42 42 791 | 7/1993 | Germany . |
| 4-500191 | 1/1992 | Japan . |
| 4-191111 | 7/1992 | Japan . |
| 5-193320 | 8/1993 | Japan . |
| 5-319056 | 12/1993 | Japan . |

*Primary Examiner*—Robert J. Oberleitner
*Assistant Examiner*—Daniel Yeagley
*Attorney, Agent, or Firm*—Foley & Lardner

[57] ABSTRACT

An apparatus and method for controlling damping force characteristics of respective vehicular shock absorbers in which vehicular vertical behavior(s) at the position(s) of the vehicular body which are forward by a predetermined distance from a tread of rear left and right road wheels are determined, the positions including front left and right road wheel sides, and corresponding vertical behavior signals are derived. Control signals for front left and right and rear left and right road wheel side shock absorbers are formed on the basis of respective processed signals having frequency-dependent characteristics formed from the vehicular behavior signal(s). The damping force characteristics of front left and right road wheel side shock absorbers are controlled on the basis of the control signals formed on the basis of the processed signal based on the front left and right road wheel vehicular behavior signals. Those of rear left and right road wheel side shock absorbers are controlled on the basis of the control signals formed on the basis of the processed signals based on the front position vehicular vertical behavior signal at the position forward from the tread between the rear left and right road wheels. The phases of the control signals V are generally matched with vehicular behavior velocity signals which would actually be generated at rear road wheel arranged positions of the vehicle.

6 Claims, 34 Drawing Sheets

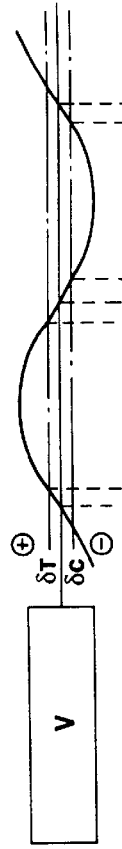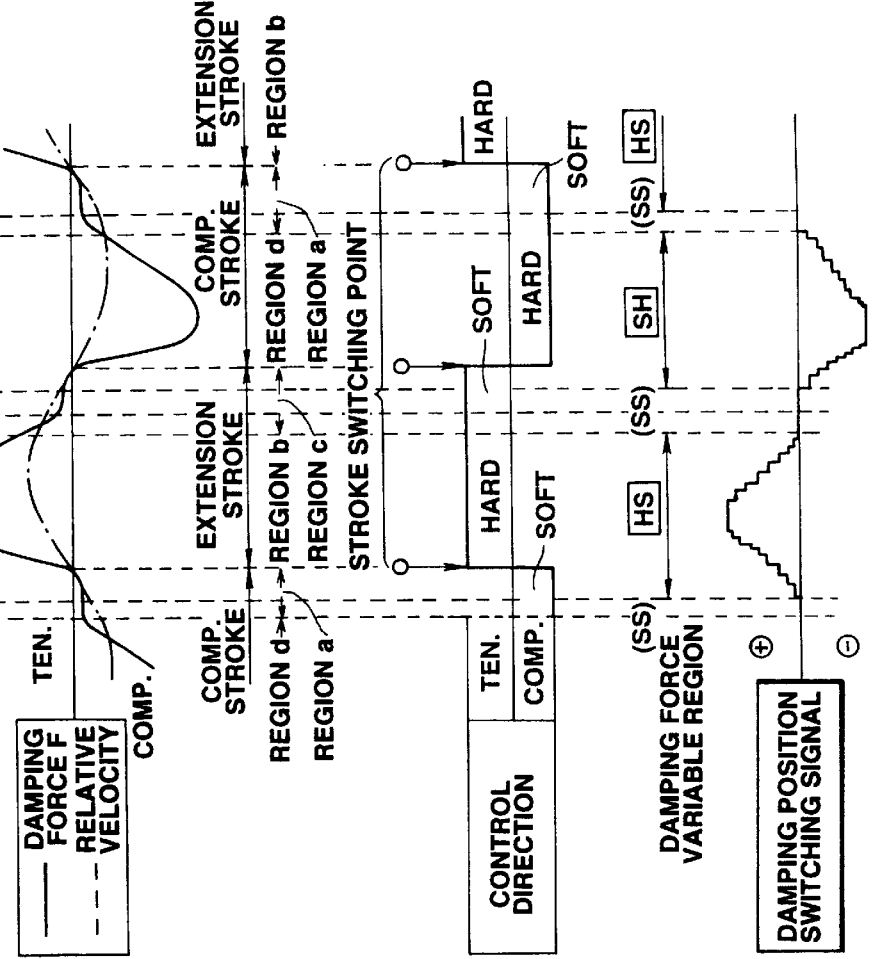
FIG.18A
FIG.18B
FIG.18C
FIG.18D
FIG.18E

IN THE CASE OF LOW VEHICLE SPEED

IN THE CASE OF HIGH VEHICLE SPEED

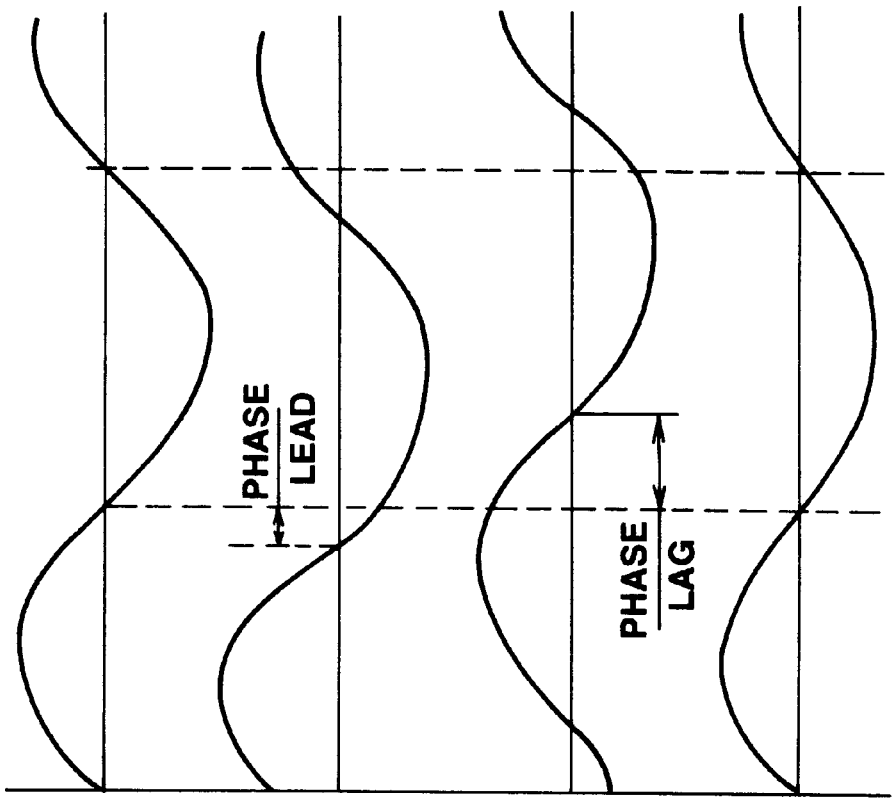

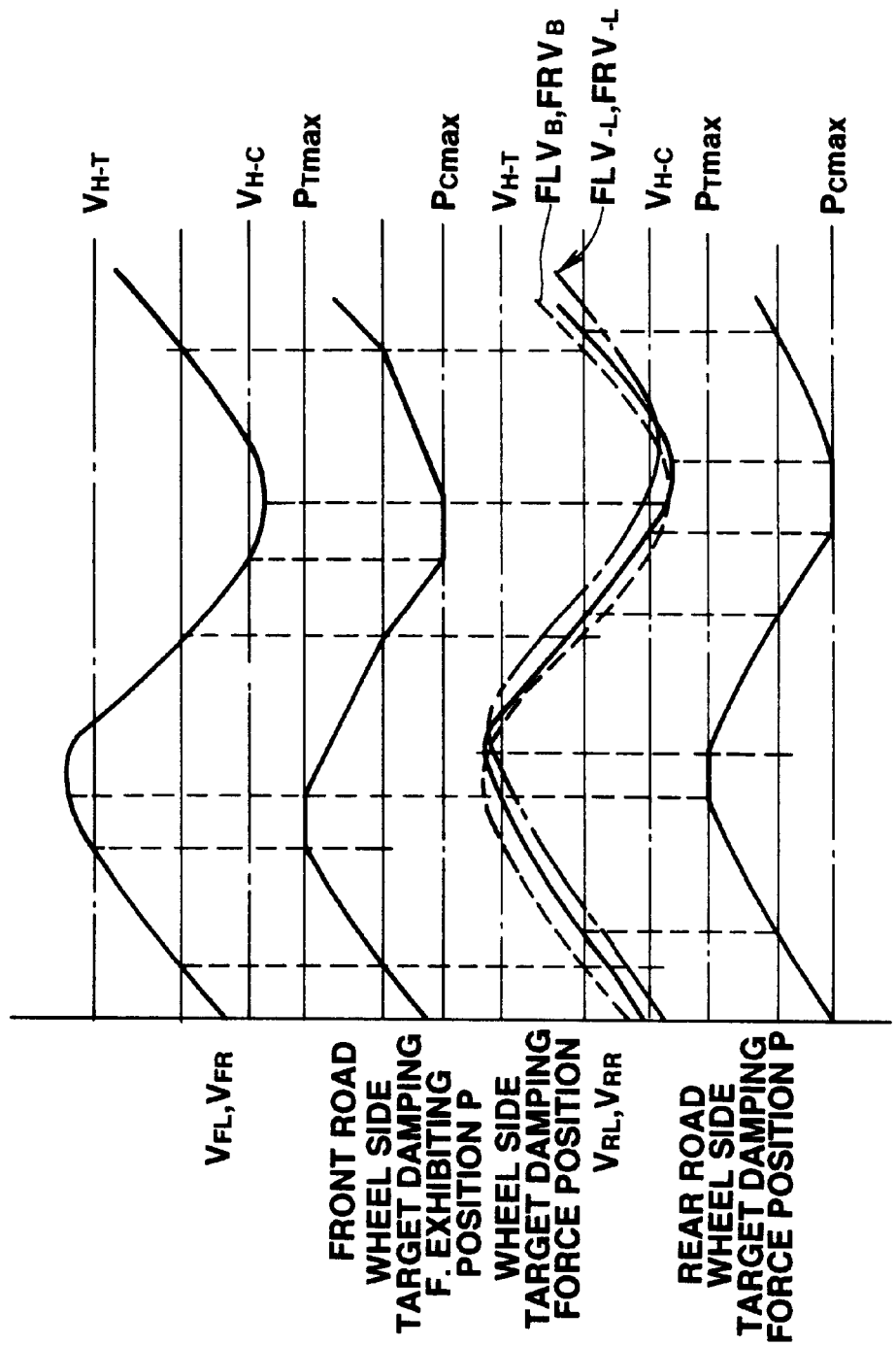

APPARATUS AND METHOD FOR CONTROLLING DAMPING FORCE CHARACTERISTIC OF VEHICULAR SHOCK ABSORBER

This application is a division of Ser. No. 08/794,053 filed Feb. 4, 1997 now U.S. Pat. No. 5,810,384 which is a continuation of 08/358,745 filed Dec. 19, 1994 abandoned.

BACKGROUND OF THE INVENTION

1. Field of The Invention

The present invention relates to an apparatus and method for optimally controlling damping force characteristics of four tire wheel suspension units (shock absorbers) of an automotive vehicle.

2. Description of Background Art

A Japanese Patent Application First Publication No. Heisei 4-191111 published on Jul. 9, 1992 exemplifies a previously proposed damping force characteristic control apparatus for respective shock absorbers interposed between a corresponding vehicular body (sprung mass) and tire wheel assemblies (unsprung mass).

In the above-identified Japanese Patent Application Publication, a plurality of actuators (shock absorbers) each interposed between the vehicle body and a rear tire (road) wheel so as to enable an increase or decrease in a suspension force (damping force characteristic) on the vehicle body with respect to the corresponding rear tire (road) wheel, a vertical acceleration sensor arranged so as to detect a vertical acceleration acted upon the vehicle body due to a vibration input from front tire wheels caused by a recess and convex formed on a road surface on which the vehicle is running, a vehicle speed sensor arranged so as to detect the vehicle speed, and control unit arranged so as to control operations of the actuators on the basis of input signals from the above-described sensors are provided in the vehicular suspension control apparatus.

The control unit described above is so constructed as to actuate the actuators, when determining that the vehicular body vertical acceleration detected from each of the vertical acceleration sensors exceeds a predetermined value, calculates a delay duration in time for which the rear road wheels have reached to the corresponding recess and convex of the road surface which has given the sprung mass vertical acceleration which exceeds the predetermined value and actuates the actuators described above according to the magnitude of the control signal derived by inverting a signal based on the vertical sprung mass acceleration after the calculated delay duration in time has passed upon passage of the front tire (road) wheels on the recess and convex of the road surface.

That is to say, in the above-identified Japanese Patent Application First Publication, even when a relatively large vibration occurs on the vehicle body at the time when the front road tire wheels have passed such a recess and convex of the road surface as described above, the control for the rear road wheel side shock absorbers is carried out so as to cancel the vertical acceleration acted upon the vehicle body by referring to the vertical acceleration acted upon the vehicle body derived at the time when the front road wheels have passed on the recess and convex of the road surface, when the rear road wheels pass on the same recess and convex of the road surface. Consequently, when the rear road wheels have passed on the same recess and convex on the road surface, the vibration input derived at the time when the front road wheels have passed the same recess and convex of the road surface can be reduced.

However, the following problems occur in the above-described shock absorber damping force characteristic control apparatus.

In general, the vertical acceleration indicative signal detected by means of the vertical sprung mass G (gravity) sensor is converted into a sprung mass vertical velocity by means of an integrating method using a low pass filter or undergoes a variety of filtering processing to reduce or eliminate noise components or unnecessary components. In this way, when a signal processing (filtering) is carried out to derive a frequency-dependent characteristic signal as described above, a phase of a processed signal tends to become an advanced (lead) state with respect to the phase of the sprung mass vertical velocity when the processed signal has a relatively low frequency and tends to become a retarded (lag) state when the processed signal has a relatively high frequency (this is appreciated from a dot line depicted in FIG. 15). Therefore, especially, when the phase is delayed due to the case when the high frequency input exceeding a sprung mass resonance frequency to the vehicle body occurs, the desired control signal cannot be obtained and, correspondingly, a vehicular riding comfort can be reduced.

It is noted that, in the above-described vehicular shock absorber control apparatus, a preview control such that a timing at which the control signal is used to control the damping forces of the shock absorbers located at the rear road wheel positions is retarded according to a vehicle speed is carried out and no elimination of the phase deviation of the filter processed signal is carried out.

Furthermore, as shown in FIG. 1, when an impulse road surface input occurs at the front road wheels (when the front road wheels pass a road surface having a recess and convex) , an interference between vehicular body front and rear portions causes simultaneous starts of behaviors at the front road wheel sides (front road wheel side sprung mass vertical velocity) and those at the rear road wheel sides (rear road wheel side sprung mass vertical velocity), in the case of the actual behaviors of the vehicle. Thus, as described above, since the preview control such that the timing at which the control signal derived at the front road wheel sides is used for the control at the rear road wheel sides is delayed according to the magnitude of the vehicle speed, a lag in a control force applied to those at the rear road wheel sides always occurs. In addition, since the control force at the rear road wheel sides is changed during the start of behaviors due to the road surface input at the front road wheel sides. Consequently, a discrepancy of feeling, in turn, occurs.

SUMMARY OF THE INVENTION

It is an object of the present invention to provide an apparatus and method for controlling damping forces of vehicular shock absorbers in which a lag in phase at a relatively high frequency side due to the signal processing to derive the processed signal having the frequency-dependent characteristic by means of a signal processing is eliminated at the control for the rear road wheel side shock absorbers with simpler construction of the apparatus and the vehicle riding comfort can be improved.

The above-described object can be achieved by providing an apparatus for an automotive vehicle, comprising: a) front left, front right, rear left, and rear right road wheel side shock absorbers, each shock absorber being interposed between a given position of a vehicular body and its corresponding one of front left and right and rear left and right road wheels and being so constructed as to be enabled to change in its damping force characteristic, said given position being defined as each one of front left and right and rear left and right road wheel arranged positions; b) damping force characteristic changing means, responsive to an input drive signal, for changing the damping force characteristic of a corresponding one of the respective shock absorbers; c) vehicular vertical behavior determining means for determining a vehicular vertical behavior at a first position of the vehicle, the first position being located forward by a predetermined distance from the rear left and right road wheel arranged position and including front left and right road wheel arranged positions, and for outputting a vehicular vertical behavior signal according to the determined vehicular vertical behavior at the first position; d) processed signal forming means for forming a processed signal having a frequency dependent characteristic from said vehicular vertical behavior signal; and e) damping force characteristic control means for forming a control signal for each one of the respective shock absorbers on the basis of the processed signal and for outputting the drive signal according to a value of the formed control signal to said damping force characteristic changing means so as to control a corresponding one of the damping force characteristics of the respective shock absorbers, a phase of said control signals for the rear left and right road wheels being generally matched with those of vehicular behavior velocity signals which would actually be generated at the rear left and right road wheel arranged positions.

The above-described object can also be achieved by providing a method for controlling damping force characteristics of vehicular front left and right and rear left and rear left and right road wheel side shock absorbers, comprising the steps of: a) determining a vehicular vertical behavior at a front road wheel arranged position of the vehicle and outputting a first vehicular behavior signal indicative thereof and which is used to control damping force characteristics for the front road wheel side shock absorbers; b) determining another vehicular behavior at a first position of the vehicle which is located forward by a predetermined distance from a tread between rear left and right road wheels of the vehicle and outputting a second vehicular vertical behavior signal indicative thereof and which is used to control damping force characteristics of the rear road wheel side shock absorbers; c) forming processed signals having frequency-dependent characteristics from either of the first or second vertical behavior signal; d) forming control signals for the front left and right and rear left and right road wheel side shock absorbers based on the processed signals at the step c) and outputting a drive signal to a corresponding one of stepping motors associated with each of the shock absorbers according to a value of the corresponding one of control signals formed on the basis of the processed signals; e) controlling damping force characteristics of the front left and right road wheel side shock absorbers on the basis of the control signals formed on the basis of one of the processed signals formed from the first vehicular behavior signal; and f) at the same time as the step e), controlling the damping force characteristics of the rear left and right road wheel side shock absorbers on the basis of the other processed signal formed from the second vehicular behavior signal.

BRIEF DESCRIPTION OF THE DRAWINGS

FIGS. 18A, 18B, 18C, 18D and 18E are waveform timing charts of the damping force characteristic control operation in the control unit of the first embodiment shown in FIG. 2.

FIGS. 43A through 43D are signal timing charts representing phase relationships between each signal and actually measured value of the sprung mass vertical velocity at the rear road wheel position.

FIGS. 47A through 47D are signal timing charts representing relationships between the front road wheel side control signals and front road wheel side target damping force positions, and relationships between the rear road wheel side control signals and rear road wheel side target damping force positions when the vehicle speed falls in the middle or low speed range.

BEST MODE CARRYING OUT THE INVENTION

Reference will hereinafter be made to the drawings in order to facilitate a better understanding of the present invention.

(First Embodiment)

Figure 1:
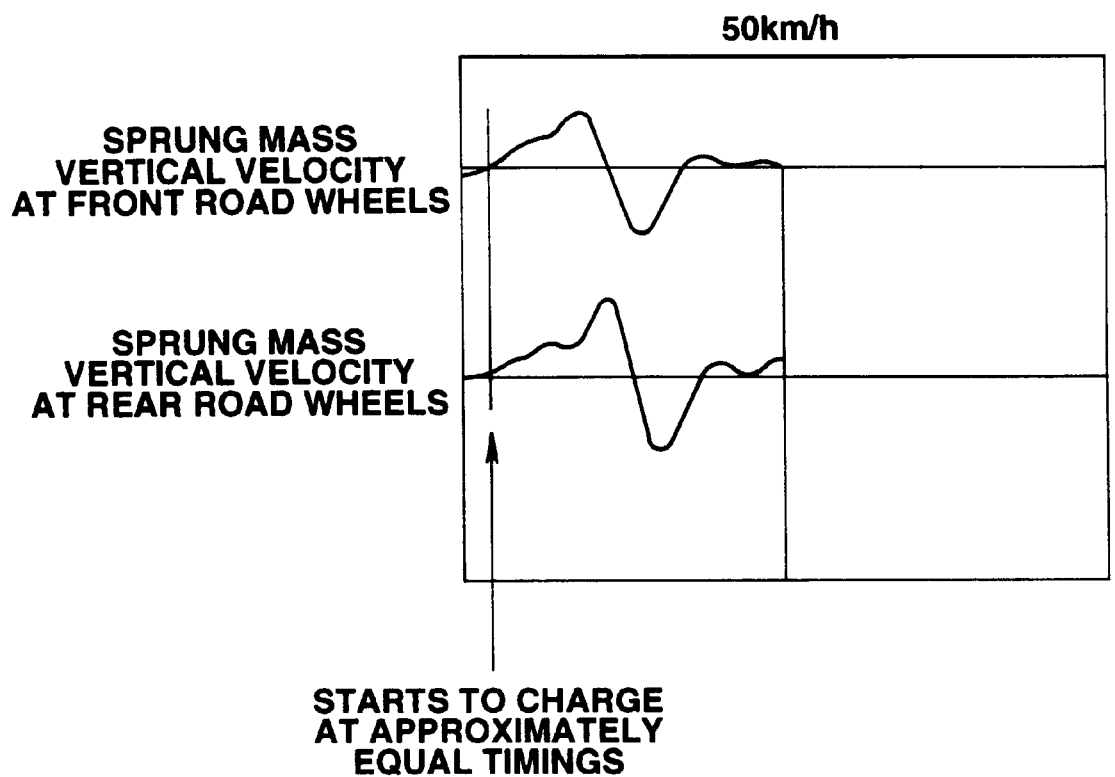
FIG. 1 is characteristic graphs of sprung mass vertical velocities at front left and right road wheel sides and at rear left and right road wheels when the vehicle speed is about 50 Km/h in the case of the damping force characteristic control apparatus described in the BACKGROUND OF THE INVENTION.
Figure 2:
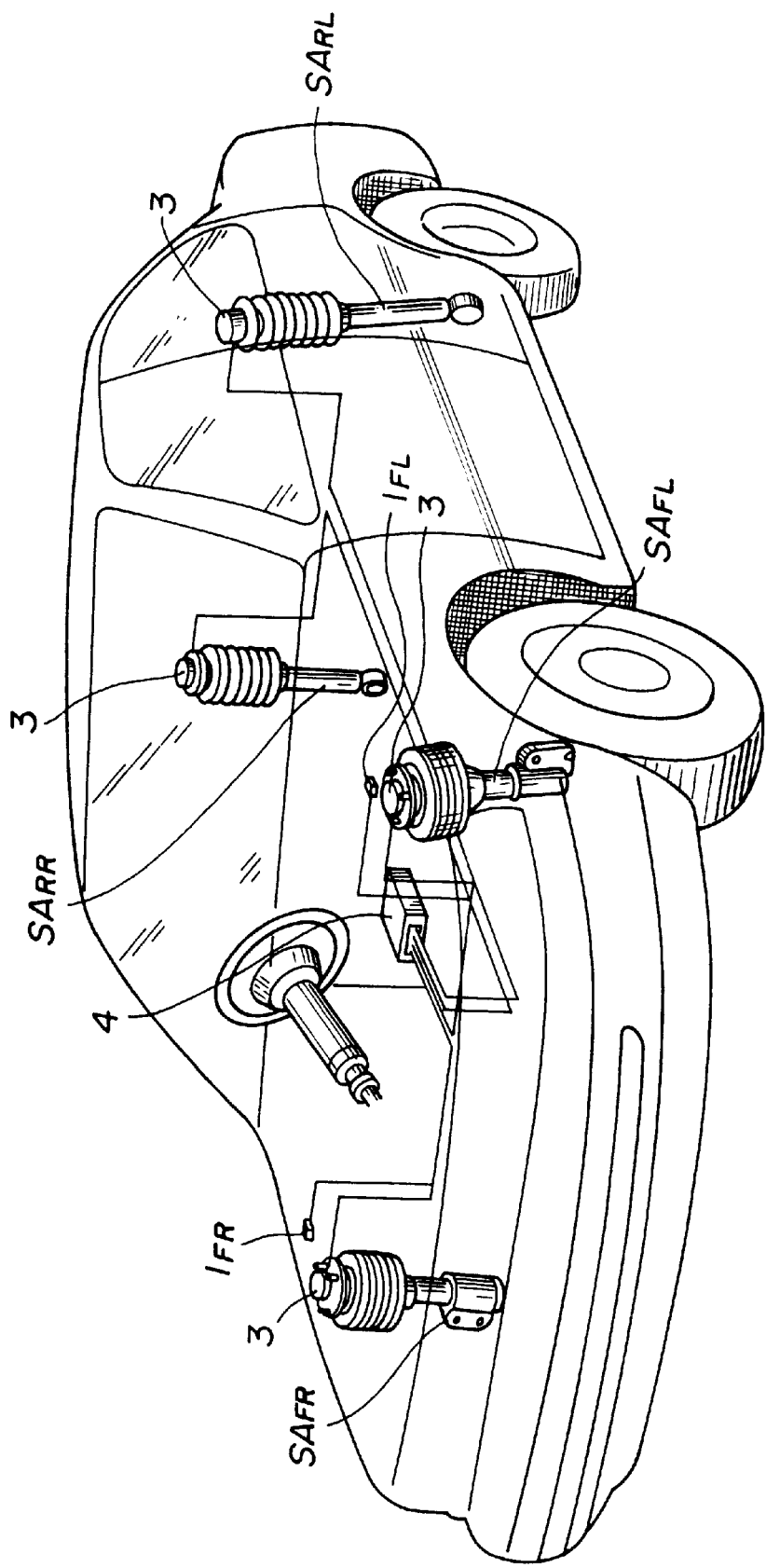
FIG. 2 is an explanatory view of an arrangement of the shock absorber damping force controlling apparatus in a first preferred embodiment according to the present invention.

FIG. 2 shows a whole system configuration of a vehicular shock absorber damping force characteristic controlling apparatus in a first preferred embodiment according to the present invention.

Four shock absorbers $SA_{FL}$, $SA_{FR}$, $SA_{RL}$, and $SA_{RR}$ (it is noted that subscripts FL denotes a front left road wheel side (position), FR denotes a front right road wheel side (position), RL denotes a rear left road wheel (position), RR denotes a rear right road wheel side, and a representative shock absorber is simply denoted by SA since all shock absorbers have the common structures) are interposed between given parts of a vehicular body (sprung mass) and respective road (tire) wheels (unsprung mass). The road wheels comprise front left tire wheel, front right tire wheel, rear left tire wheel, and rear right tire wheels of the vehicle. It is noted that the above-described given parts of the vehicular body indicate front left and right road wheel positions and rear left and right road wheel positions.

As shown in FIG. 2, a pair of front left and right sprung mass vertical acceleration sensors $I_{FL}$, $I_{FR}$ are attached onto the given parts of the vehicular body, namely, onto the front left and right road wheel positions adjacent to the corresponding front left and right road wheels, each of the front left and right road wheels being suspended by the corresponding shock absorbers $SA_{FR}$ and $SA_{FL}$. The pair of front left and right sprung mass vertical acceleration sensors 1 ($1_{FL}$, $1_{FR}$) serve to detect sprung mass vertical accelerations at the front left and right road wheel positions of the vehicular body. A control unit 4 is installed on a portion of the vehicular body near to a driver's seat. The control unit 4 receives the sprung mass vertical acceleration signals G (gravity) ($G_{FL}$, $G_{FR}$) from the respective front left and right road wheel side sprung mass vertical acceleration (G) sensors $1_{FL}$, $1_{FR}$ and outputs a drive signal to a corresponding one of stepping (pulse) motors 3 so as to change the damping force characteristic of the corresponding one SA of the shock absorbers as will be described later.

Figure 3:
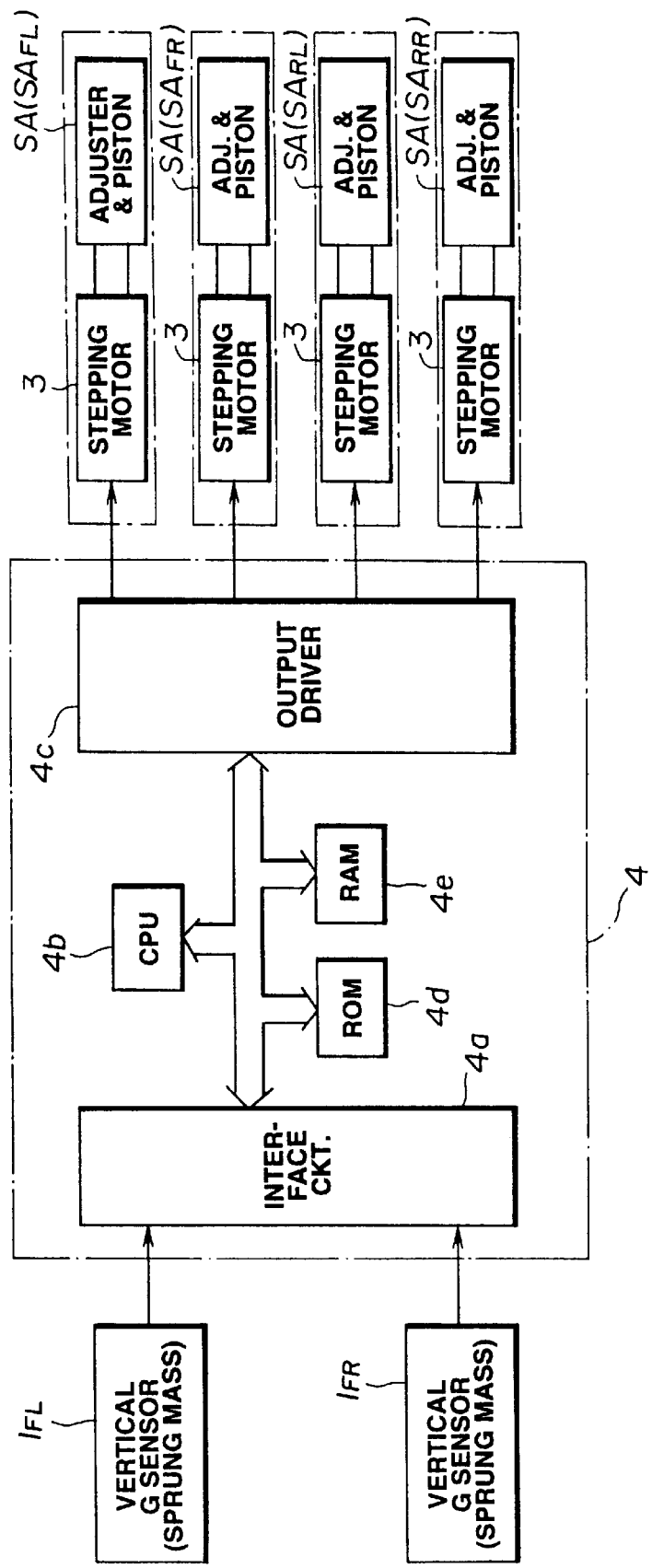
FIG. 3 is a circuit block diagram of a control unit and its peripheral circuit of the shock absorber damping force controlling apparatus shown in FIG. 2.

FIG. 3 shows a circuit block diagram of the damping force characteristic controlling apparatus in the first preferred embodiment according to the present invention.

The control unit 4 includes an interface circuit 4a, CPU (Central Processing Unit) 4b, ROM 4d, and RAM 4e, and an output driver 4c.

The interface circuit 4a receives the vertical sprung mass acceleration indicative signals ($G_{FL}$, $G_{FR}$) from the pair of the sprung mass vertical acceleration (G) sensors $1_{FL}$ and $1_{FR}$ at the front left and right road wheel positions shown in FIG. 3.

Figure 14:
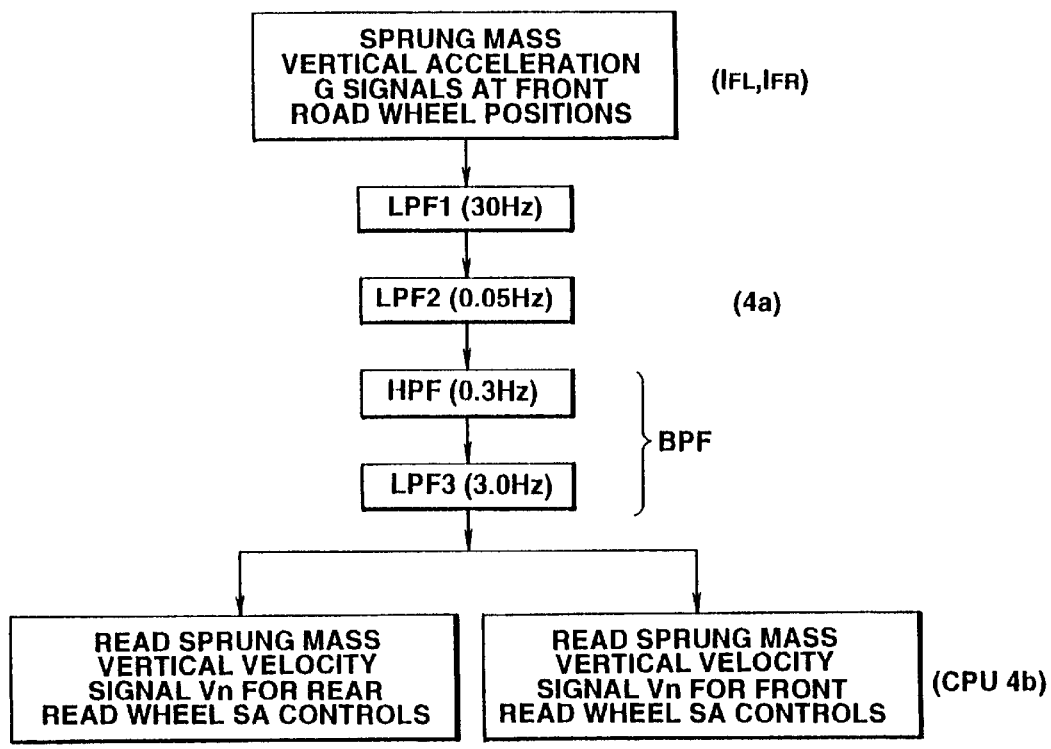
FIG. 14 is a signal processing circuit for an input sprung mass vertical acceleration signal G in the case of the first embodiment shown in FIGS. 2 through 13.

FIG. 14 shows a signal processing circuit installed in the interface circuit 4a of the control unit 4.

As shown in FIG. 14, the interface circuit 4a includes: a first low pass filter LPF1 which is so constructed as to mainly eliminate noises of a high frequency region (30 Hz or higher) from one of the sprung mass vertical acceleration indicative signals G ($G_{FL}$, $G_{FR}$) of the sprung mass vertical acceleration sensors $I_{FL}$ and $I_{FR}$; a second low pass filter LPF2 which is so constructed as to mainly integrate the sprung mass vertical acceleration signal G ($G_{FL}$, $G_{FR}$) passed through the first low pass filter LPF1 so as to derive a sprung mass vertical velocity signal indicating the sprung mass vertical velocity; a first high pass filter HPF having a cut-off frequency of 0.3 Hz; and a third low pass filter LPF3 having a cut-off frequency of 3.0 Hz, both first and third high-pass and low-pass filters HPF and LPF3 constituting a band-pass filter BPF to derive the sprung mass vertical velocity signal $V_n$ including a sprung mass resonance frequency signal component. It is noted that these filters are connected in series with one another as shown in FIG. 14 and the same structure of the signal processing circuit shown in FIG. 14 is provided in the other sprung mass vertical acceleration signal of the other vertical sprung mass acceleration (G) sensor ($I_{FL}$, $1_{FR}$) shown in FIG. 3.

Figure 4:
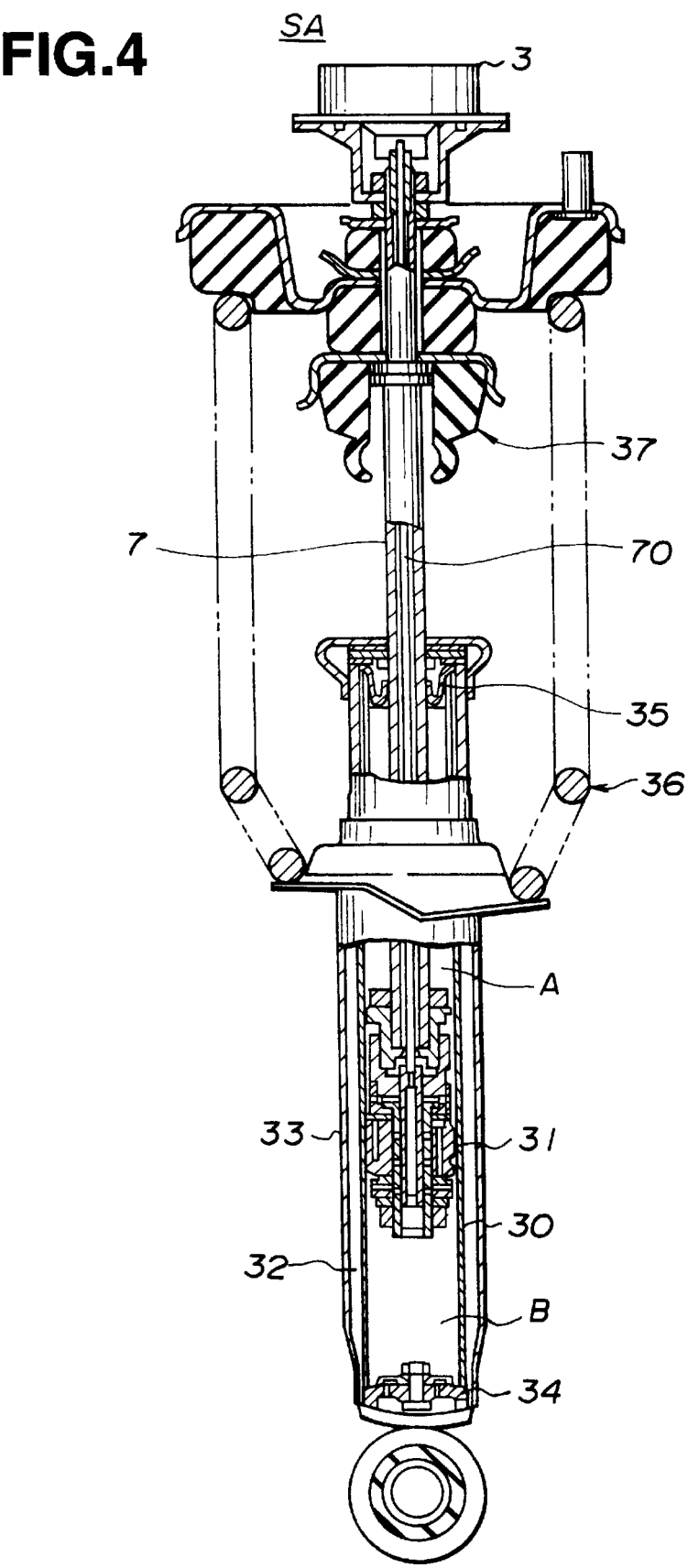
FIG. 4 is a partially sectional view of each shock absorber SA used in the first embodiment shown in FIGS. 2 and 3.

Next, FIG. 4 show a cross sectional view of each shock absorber SA ($SA_{FL}$ through $SA_{FR}$).

The shock absorber SA, as shown in FIG. 4, includes: a cylinder 30, a (movable) piston 31 defining an upper portion chamber A and a lower portion chamber B; an outer envelope 33 in which a reservoir chamber 32 is formed on an outer peripheral end of the cylinder 30; a base 34 which defines the lower chamber B and the reservoir chamber 32; a guide member 35 which guides a sliding motion of a piston rod 7 with the other end of which the movable piston 31 is linked; a suspension spring 36 interposed between the outer envelope 33 and vehicle body; and a bumper rubber 37.

Each stepping motor 3 shown in FIGS. 2 and 3 is installed in an upper position of the corresponding one of the shock absorbers SA, as shown in FIG. 4, so as to operatively rotate an adjuster 40 (refer to FIG. 5) via a control rod 70 in response to a rotation drive signal from the output driver 4c. A rotating shaft of the corresponding one of the stepping motors 3 is mechanically connected to the corresponding adjuster 40 within each shock absorbers SA via the control rod 70.

Figure 5:
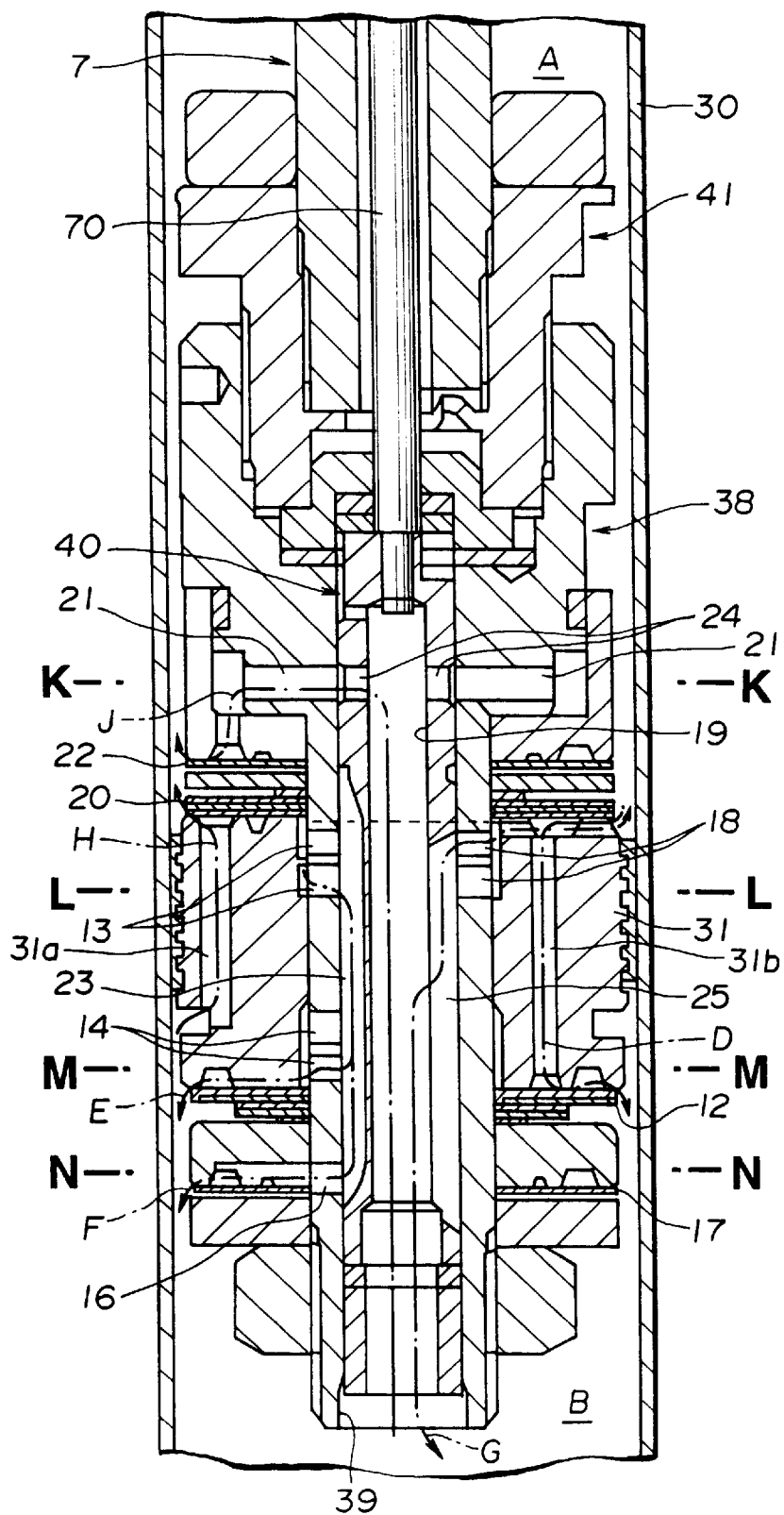
FIG. 5 is an enlarged, partially sectional view of the representative shock absorber SA shown in FIG. 3.

FIG. 5 shows an enlarged cross sectional view representing a part of the piston assembly 31 and its surrounding part of each of the shock absorbers SA.

As shown in FIG. 5, the piston 31 is formed with penetrating holes 31a and 31b. In addition, the piston 31 is provided with a compression stroke side attenuation valve 20 and an extension stroke side attenuating valve 12 respectively opening and closing the respective penetrating holes 31a and 31b. A stud 38 is spirally meshed with and fixed to a bound stopper 41 spirally meshed with and fixed to a tip end of the piston rod 7. The stud 38 is penetrated through the piston 31. In addition, the stud 38 is formed with a communication hole 39 which communicates the upper portion chamber A and the lower portion chamber B. Furthermore, the adjuster 40 which changes a flow passage cross sectional area of the communication hole 39 is provided in the piston assembly.

Furthermore, an extension stroke side check valve 17 and a compression stroke side check valve 22 are also installed which enable and disable the fluid flow through the communication hole 39 in accordance with the direction of the flow of the fluid.

It is noted that the stud 38 is formed with a first port 21, a second port 13, a third port 18, a fourth port 14, and fifth port 16, respectively in an upper order.

On the other hand, referring to FIG. 5, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and lower portion chamber B as the fluid flow passages when the piston stroke indicates the extension stroke: that is to say, 1) an extension stroke side first flow passage D such that the fluid passes the penetrating hole 31b, a valve opened internal side of the extension stroke side attenuation valve 12, and reaches the lower portion chamber B; 2) an extension stroke side second flow passage E in which the fluid flows through the second port 13, the longitudinal groove 23, the fourth port 14, a valve opened outer peripheral side of the extension stroke side attenuating valve 12, and reaches the lower portion chamber B: 3) an extension stroke side third flow passage F in which the fluid passes through the second port 13, the longitudinal groove 23, and the fifth port 16: and 4) a bypass flow passage G in which the fluid passes through the third port 18, the second lateral hole 25, and the hollow portion 19 and reaches the lower portion chamber B.

In addition, the three fluid flow passages through which the fluid can be caused to flow during the compression stroke side of the piston 31 include: 1) a compression stroke side first flow passage H in which the fluid flows through the penetrating hole 31a and valve opened compression stroke side attenuating valve 20; 2) a compression stroke side second flow passage J in which the hollow portion 19, the first lateral hole 24, the first port 21, and the opened compression stroke side check valve 22 and reaches the upper portion chamber A; and 3) the bypass passage G in which the fluid flows through the hollow portion 19, the second lateral hole 25, and the third port 18.

Figure 6:
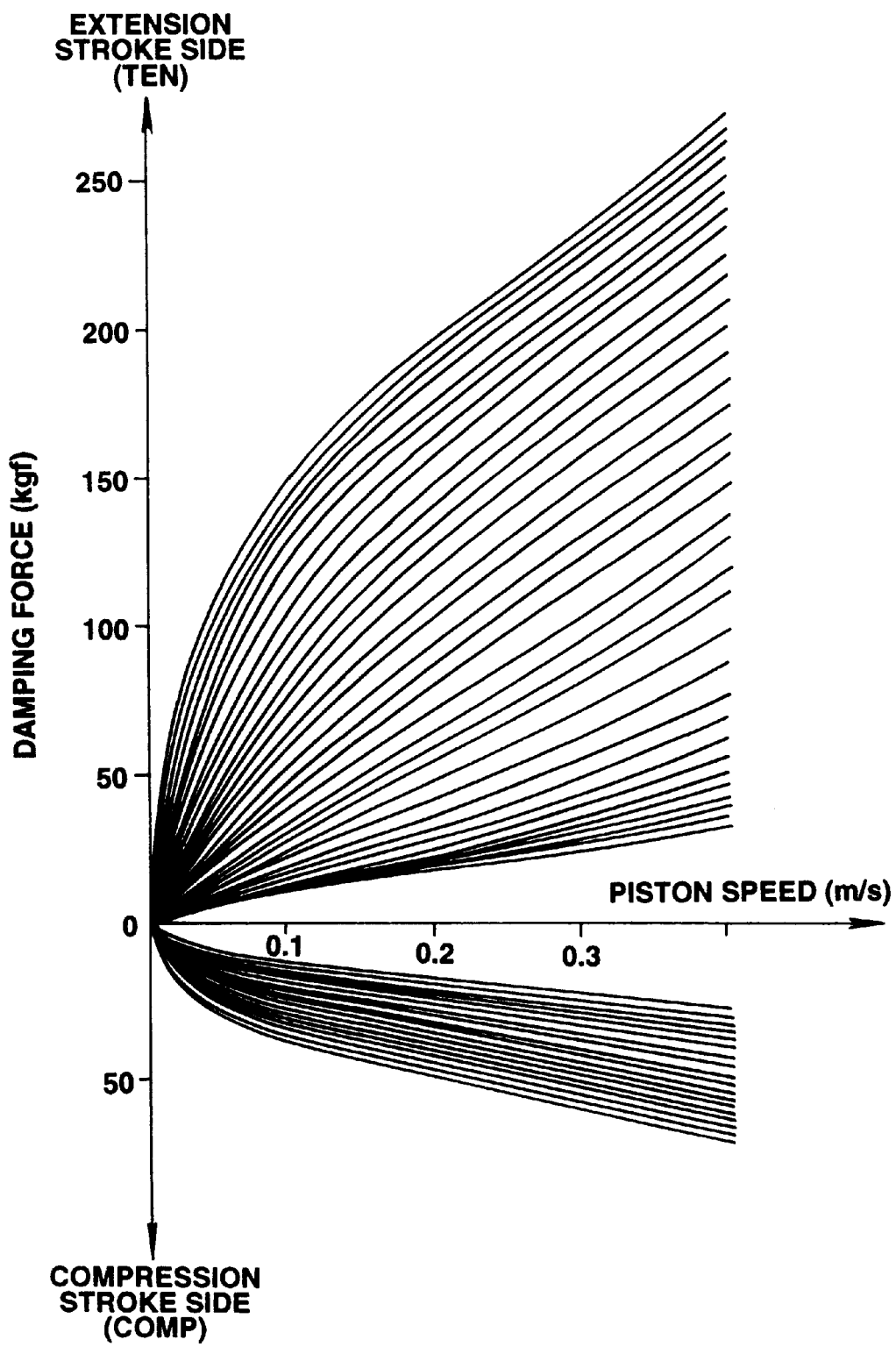
FIG. 6 is a characteristic graph representing damping forces with respect to a piston speed of the representative shock absorber shown in FIGS. 4 and 5.

In summary, the shock absorber SA is so constructed as to be enabled to change the damping force characteristics at a multiple stage in its damping characteristic, as shown in FIG. 6, either in the extension stroke side or compression stroke side when the adjuster 40 is pivoted according to the rotation of the corresponding one of the stepping motors 3.

Figure 7:
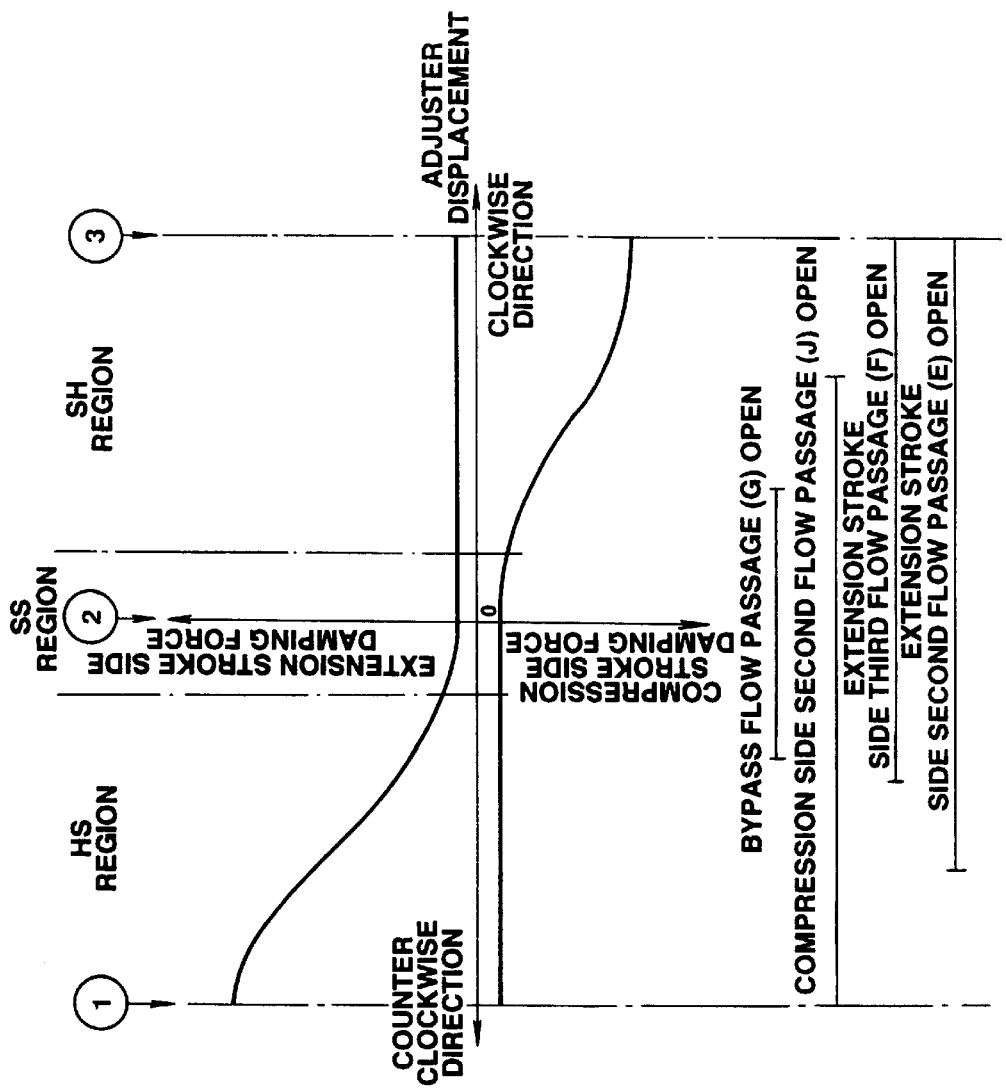
FIG. 7 is a damping coefficient characteristic graph representing a damping force region corresponding to a stepped position of an adjuster according to the rotation of a representative pulse (stepping) motor shown in FIGS. 2 and 3.

FIG. 7 shows relationships between the rotated position of the adjuster 40 and damping force characteristics at both the extension stroke and compression stroke sides with respect to the piston 31.

In details, as shown in FIG. 7, when the adjuster 40 is pivoted in a given counterclockwise direction from a generally center position at which both of the extension and compression stroke sides are in soft damping force characteristic positions (hereinafter, referred to as a soft region SS), the damping force coefficient at the extension stroke side can be changed at the multiple stage from a maximum hard to a minimum hard characteristic but the compression stroke side is fixed at a soft position (hereinafter, referred to as an extension stroke side hard region HS). On the contrary, when the adjuster 40 is pivoted in a given clockwise direction therefrom, the damping force coefficient at the compression stroke side is only changeable to a hard region from the maximum hard to the minimum hard characteristic at the multiple stages and the damping force characteristic at in the compression stroke side is fixed to the soft position (hereinafter, referred to as a compression hard region SH).

Figure 8A:
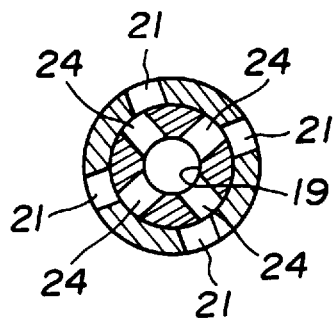
FIGS. 8A, 8B, and 8C are cross sectional views cut away along a line K—K of FIG. 7 representing an essential part of the representative shock absorber shown in FIGS. 4 and 5.
Figure 8B:
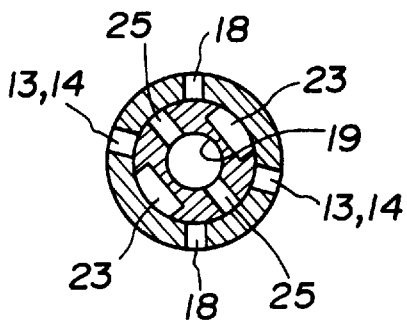
Figure 8C:
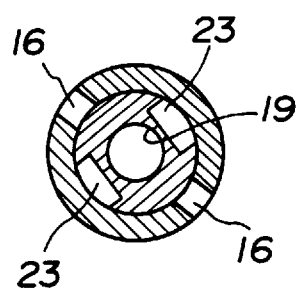
Figure 9A:
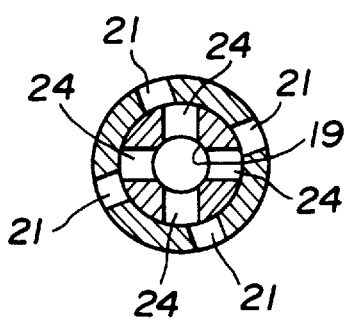
FIGS. 9A, 9B, and 9C are cross sectional views cut away along lines L—L and M—M of FIG. 7 representing an essential part of the representative shock absorber shown in FIGS. 4 and 5.
Figure 9B:
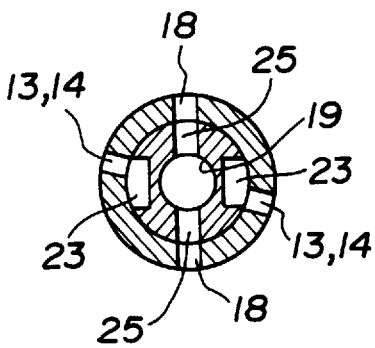
Figure 9C:
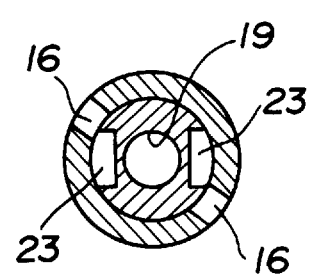
Figure 10A:
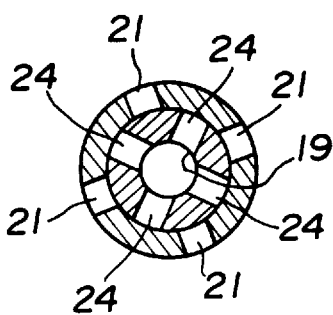
FIGS. 10A, 10B, and 10C are cross sectional views cut away along a line N—N of FIG. 7 representing an essential part of the representative shock absorber shown in FIGS. 4 and 5.
Figure 10B:
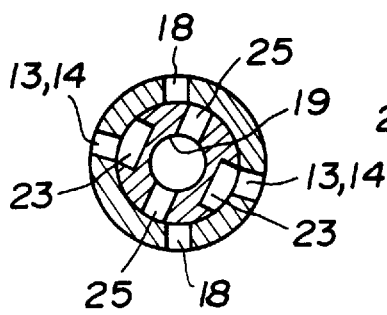
Figure 10C:
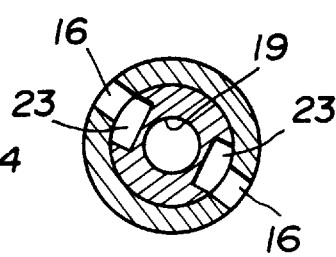
Figure 11:
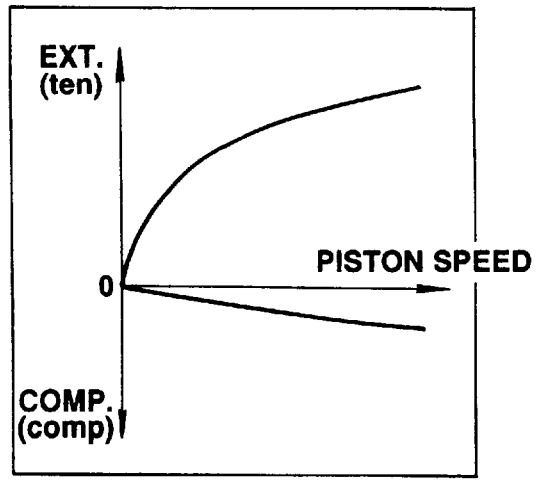
FIG. 11 is a damping force characteristic graph when an extension stroke side with respect to the piston of the representative shock absorber shown in FIG. 4.
Figure 12:
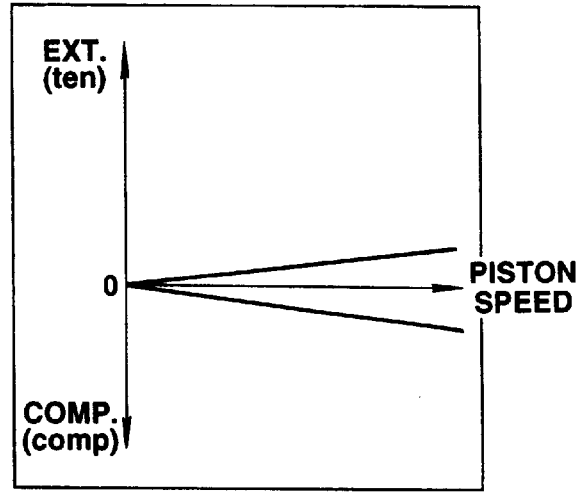
FIG. 12 is a damping force characteristic graph when both extension and compression stroke sides are in soft damping force states.
Figure 13:
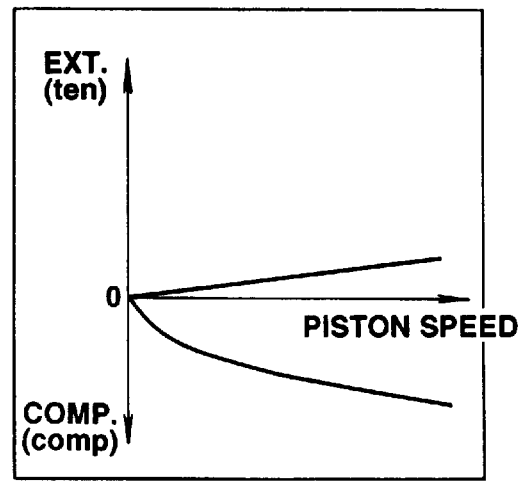
FIG. 13 is a damping force characteristic graph when the compression stroke side is in a hard damping force state.

When, as shown in FIG. 7, the adjuster 40 is pivoted at any one of positions ①, ②, and ③, cross sections of the piston assembly portions cut away along lines K—K, L—L, M—M, and N—N of FIG. 5 are respectively shown in FIGS. 8A (①), 8B (②), and 8C (③) (K—K), 9A (①), 9B (②), and 9C (③) (L—L, M—M), 10A (①), 10B ②, and 10C (③)(N—N), respectively. The damping force characteristics at the respective positions ①, ② and ③ shown in FIG. 7 are shown in FIGS. 11, 12, and 13, respectively.

Figure 16:
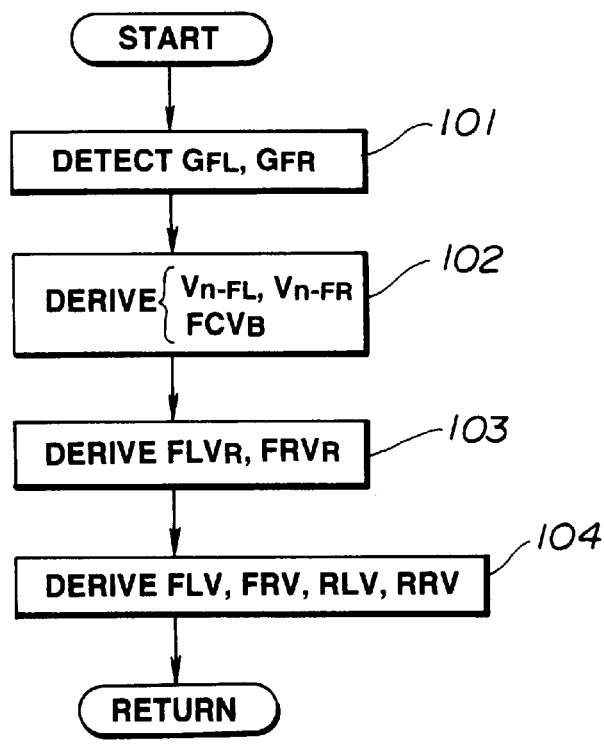
FIG. 16 is an operational flowchart indicating a control operation to derive control signals executed in a control unit of the first embodiment shown in FIGS. 2 through 13.

Next, FIG. 16 shows an operational flowchart for deriving control signals (this control signal is representatively denoted by V) for the respective front and rear road wheel side shock absorbers SA (SA$_{FL}$ through SA$_{RR}$) by means of the control unit 4.

At a step 101, the CPU 4b fetches data on the sprung mass vertical acceleration acted upon the given parts of the vehicular body G$_{FL}$, G$_{FR}$ on which the front left and right side shock absorbers SA$_{FL}$, SA$_{FR}$ are mounted from the pair of front left and right sprung mass vertical G sensors I$_{FL}$ and IF$_{FR}$.

At a step 102, the CPU 4b fetches data on the sprung mass vertical velocity V$_n$ (V$_{n-FL}$ ---- front left road wheel side, V$_{n-FR}$ --- front right road wheel side) derived from the signal processing circuit shown in FIG. 14 by integrating each of the sprung mass vertical acceleration indicative signals G$_{FL}$ and G$_{FR}$ and derives a bouncing component FCV$_B$ acted upon a center position of the vehicular body (sprung mass) located at a center between the front left and right road wheel sides using the following formula (1).

It is noted that the sprung mass vertical velocity V$_n$ has a positive value when a direction of the velocity V$_n$ is upward (height direction of the vehicle body) and has a negative value when a direction thereof is downward (ground direction of the vehicle body).

$$FCV_B = (V_{n-FL} + V_{n-FR})/2 \qquad (1)$$

At a step 103, the CPU 4b derives each rolling component V$_R$ (FLV$_R$, FRV$_R$) acted upon the vehicular body at the corresponding one of the given parts on which the front left and right shock absorbers SA$_{FL}$ and SA$_{FR}$ are suspended.

$$FLV_R = V_{n-FL} - V_{n-FR},$$
$$FRV_R = V_{n-FR} - V_{n-FL} \qquad (2).$$

FL denotes the front left road wheel side, and FR denotes the front right road wheel side.

At a step 104, the CPU 4b derives each control signal V for the corresponding one of the respective shock absorbers SA on the basis of the corresponding one of the following equations (3).

$$FLV = \alpha_f FCV_B + \gamma_f FLV_R,$$
$$FRV = \alpha_f FCV_B + \gamma_f FRV_R,$$
$$RLV = \alpha_r FCV_B + \gamma_f FLV_R,$$
$$RRV = \alpha_r FCV_B + \gamma_f FRV_R \qquad (3).$$

$\alpha_f$, $\gamma_f$; each proportional constant for FLV$_B$ and for FRV$_R$,
$\alpha_f$, $\gamma_f$; each proportional constant for FLV$_R$ and for FRV$_R$.

Each first term of a right side in the corresponding one of the equations (3) denotes a bouncing rate and each second arm of the right side in the corresponding one of the equations (3) denotes a rolling rate.

As described above, the routine to derive the control signals is ended at the step 104 and the routine returns to the step 101 to repeat the above driving steps.

In this way, the control signals RLV and RRV for the rear left and right road wheel sides are derived on the basis of the vehicular body bouncing component FC$_{VB}$ at the positions of the front left and right shock absorbers SA$_{FL}$ and SA$_{FR}$ and rolling components FL$_{VR}$ and FR$_{VR}$ at the front right and left shock absorbers SA$_{FL}$ and SA$_{FR}$ in the same way as those control signal FLV and FRV at the front road wheel side so that the control signals V which are corrected in terms of the phase deviations due to the signal processing.

Figure 15:
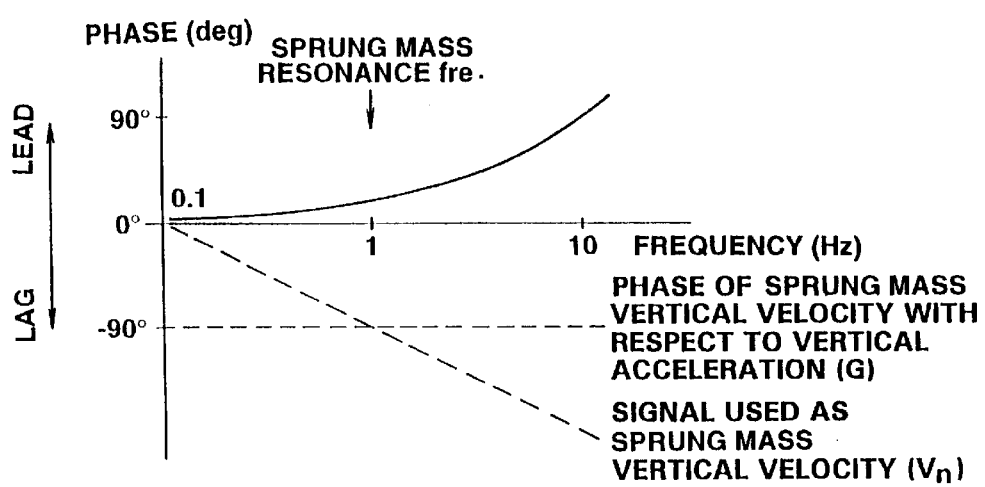
FIG. 15 is characteristic graphs representing phase relationships between each signal and input signal frequency.

That is to say, referring to FIG. 15 which shows the phase characteristics of each signal with respect to the input frequency, the phase state of the signal processed sprung mass vertical velocity V$_n$ is, as denoted by a broken line, delayed with respect to that G when the input frequency becomes high ( in the direction such as to be delayed in proportion to a magnitude (value) of the frequency). On the other hand, since as denoted by a solid line of FIG. 15, a phase of the sprung mass vertical acceleration signal detected at the front road wheel side with respect to a sprung mass vertical acceleration signal to be detected at the rear road wheel side is advanced in proportion to the magnitude of the input frequency. Therefore, in the first embodiment, when the control signals formed on the basis of the above-described phase advanced sprung mass vertical acceleration signal G are used for the control signals for the rear road wheel sides, the phase delay due to the signal processing as described above can be eliminated at the rear road wheel side. Hence, the vehicular comfort can be improved since the phase delay problem at the higher frequency side than the sprung mass resonance frequency can be eliminated.

Figure 19:
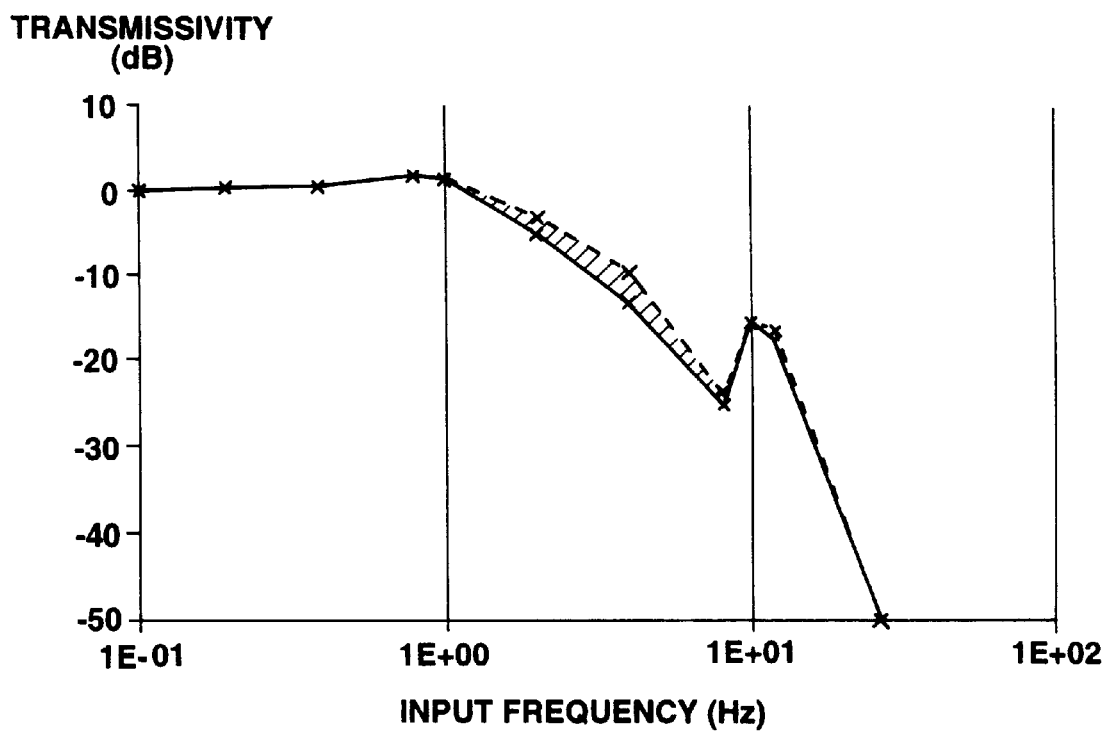
FIG. 19 is a characteristic graph of a transmissivity of the input frequency onto the sprung mass in the case of the first embodiment shown in FIGS. 2 through 13.

FIG. 19 shows characteristic graphs of transmissitivities of input frequency onto the sprung mass (vehicular body) when the first embodiment is carried out and when the previously proposed damping force characteristic control apparatus is carried out.

As shown in FIG. 19, in the first embodiment, as denoted by the solid line, a transmissivity (or transmittance or transmissibility) of the input frequency to the sprung mass at higher frequency range than the resonance frequency point (1E+00) is reduced than that of the previously proposed damping force characteristic controlling apparatus described in the BACKGROUND OF THE INVENTION. Consequently, the vehicular body gives the vehicular occupant no feeling of ruggy vibrations and/or of running on the highly consecutive running of rough roads.

Figure 17:
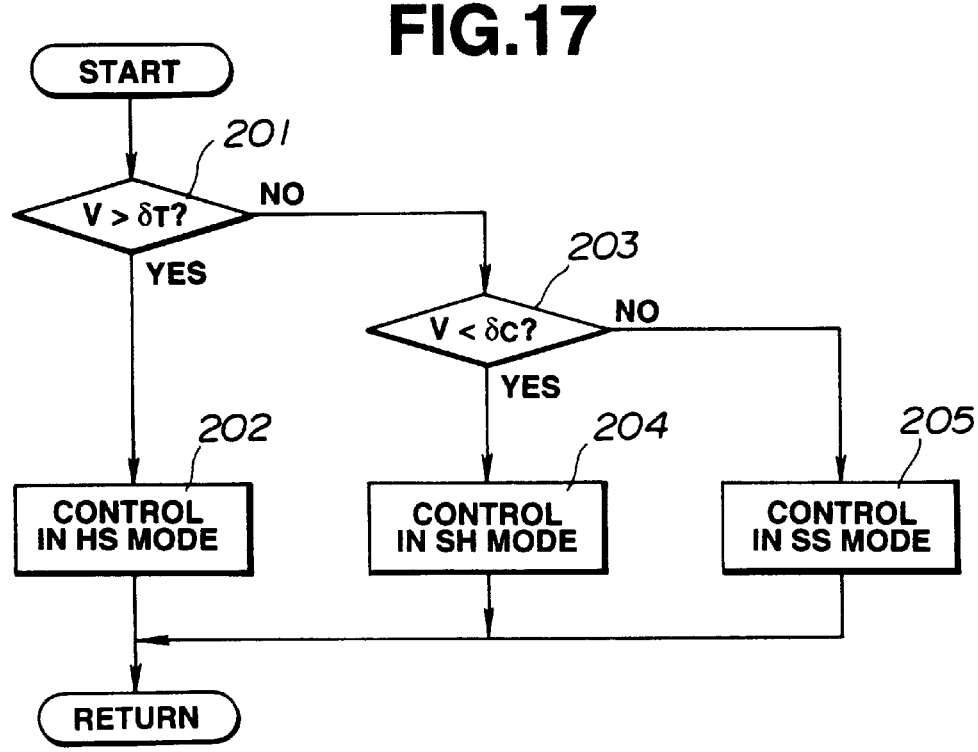
FIG. 17 is another operational flowchart of a damping force characteristic control operation in the control unit of the first embodiment shown in FIG. 2.

FIG. 17 shows an operational flowchart of controlling the damping force characteristic of each shock absorber SA on the basis of the control signal V.

At a step 201, the CPU 4b determines whether the control signal V is higher than a predetermined positive threshold value $\delta_T$. If Yes at the step 201, the CPU 4b controls the corresponding one of the shock absorbers SA at a step 202 in such a mode that the extension stroke side provides the hard region and the compression stroke side provides the soft region (so called, extension stroke side hard region HS). If No at the step 201, the routine goes to a step 203 in which the CPU 4b determines whether the control signal V, in turn, is less than a predetermined negative threshold value $\delta_c$. If Yes at the step 203, the routine goes to a step 204 in which the CPU 4b issues the command to the driver 4c to control the corresponding one of the shock absorbers SA in the control of SH mode in which the compression stroke side is at the hard damping force characteristic side and the extension stroke side is at the soft region (SH). If No at the step 203 ($+\delta_T \leq V \leq -\delta_C$), the routine goes to a step 205 in which CPU 4b issues the command to the driver 4c to control the damping force characteristic of the corresponding one of the shock absorbers SA in the SS region mode in which both extension stroke and compression stroke sides are in the soft regions (SS).

FIGS. 18A through 18E show timing charts of the control operations in the damping force characteristic controlling apparatus in the first embodiment.

The control signal V based on the sprung mass vertical velocity signal $V_n$ has a value which falls between the predetermined positive and negative threshold values $\delta_T$ and $-\delta_C$, the representative shock absorber SA is controlled in the SS mode (both extension and compression stroke sides are in the soft regions).

When the control signal V exceeds the predetermined positive threshold value $\delta_T$, the extension stroke side region is controlled in the HS region (hard damping force characteristic side in which the damping force characteristic is varied in proportion to the value of the control signal V. At this time, the damping force characteristic C is controlled as C=k·V, k denoting the proportional constant.

In addition, when the control signal V is below the predetermined negative threshold value $-\delta_C$, the compression stroke side is controlled in the compression stroke side hard region SH and the damping force characteristic at the compression stroke side is varied in accordance with the value of the control signal V with the compression stroke side fixed to the soft region. At this time, the damping force characteristic C is C=k V.

When the sprung mass vertical velocity (control signal V) has the same sign as that of relative velocity between the sprung mass and the unsprung mass (regions b and d of FIG. 18c), the stroke side of the shock absorbers SA at this time is controlled in the hard characteristics (region b is the extension stroke side and region d is the compression stroke side). When the sprung mass vertical velocity (control signal V) has the different sign as that of the relative velocity between the sprung mass and the unsprung mass (regions a and c), the stroke side of the shock absorber SA is controlled in the soft characteristic (region a is the compression stroke side and region c is the extension stroke side). In this way, the same control as a damping force characteristic based on a sky hook theory can be carried out only using the pair of the front road wheel side sprung mass vertical acceleration sensor 1. Furthermore, when the control regions are transferred from the region a to the region b and from the region c to the region d, the switching of the damping force characteristic can be carried out without the drive to the corresponding one of the stepping motors 3.

Therefore, the following advantages occur in the first embodiment.

(1) Since the phase delay at the higher frequency side by means of the signal processing to derive the signal having the frequency dependency is eliminated at the rear road wheel side, the vehicular comfort can be improved.

(2) Since the sprung mass vertical G sensors as the sprung mass behavior detecting means are installed merely at the pair of front left and right sprung mass road wheel positions, the reduction of the apparatus system cost can be achieved and the vehicular body rolling component can be suppressed.

(3) Since the frequency of switching the damping force characteristics becomes reduced as compared with the damping force characteristic controls based on the sky hook theory, the control response characteristic can be enhanced, the durability of the stepping motors and reduction in consumed power can be achieved.

(Second Embodiment)

Figure 20:
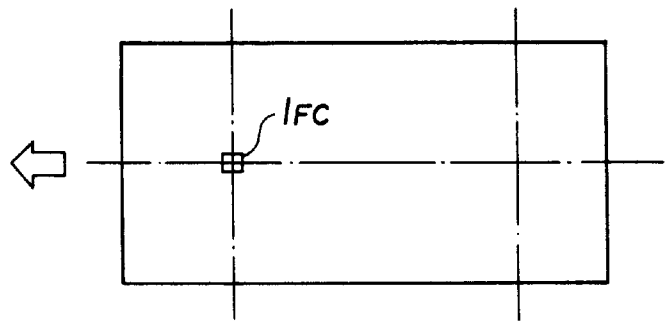
FIG. 20 is an explanatory top view of the vehicle in which a vertical acceleration sensor is mounted on a center portion of a vehicular body between the front road wheels in a case of a second embodiment.

FIG. 20 shows a second preferred embodiment of the damping force characteristic controlling apparatus according to the present invention.

The other structure of the damping force characteristic controlling apparatus is generally the same as that in the first embodiment.

As shown in FIG. 20, a single sprung mass vertical acceleration sensor $1_{FC}$ is installed on the vehicular body at the generally center position between the given parts of the vehicular body on which the front left and right road wheel side shock absorbers $SA_{FL}$ and $SA_{FR}$ are suspended. In the second embodiment, the control signal V derived on the basis of the sprung mass vertical velocity signal $V_{n-FC}$ located at the center position of the front road wheel-sides is used to control the damping force characteristics of all of the shock absorbers $SA_{FL}$, $SA_{FR}$, $SA_{RL}$, and $SA_{RR}$ at the simultaneous time.

Hence, the same advantages as described in the first embodiment can be achieved except the rolling control (the rolling rate cannot be achieved in the second embodiment) as in the case of the first embodiment. In addition, since only one sprung mass vertical acceleration (G) sensor $1_{FC}$ is provided, the apparatus system cost can accordingly be reduced.

(Third Embodiment)

Figure 21A:
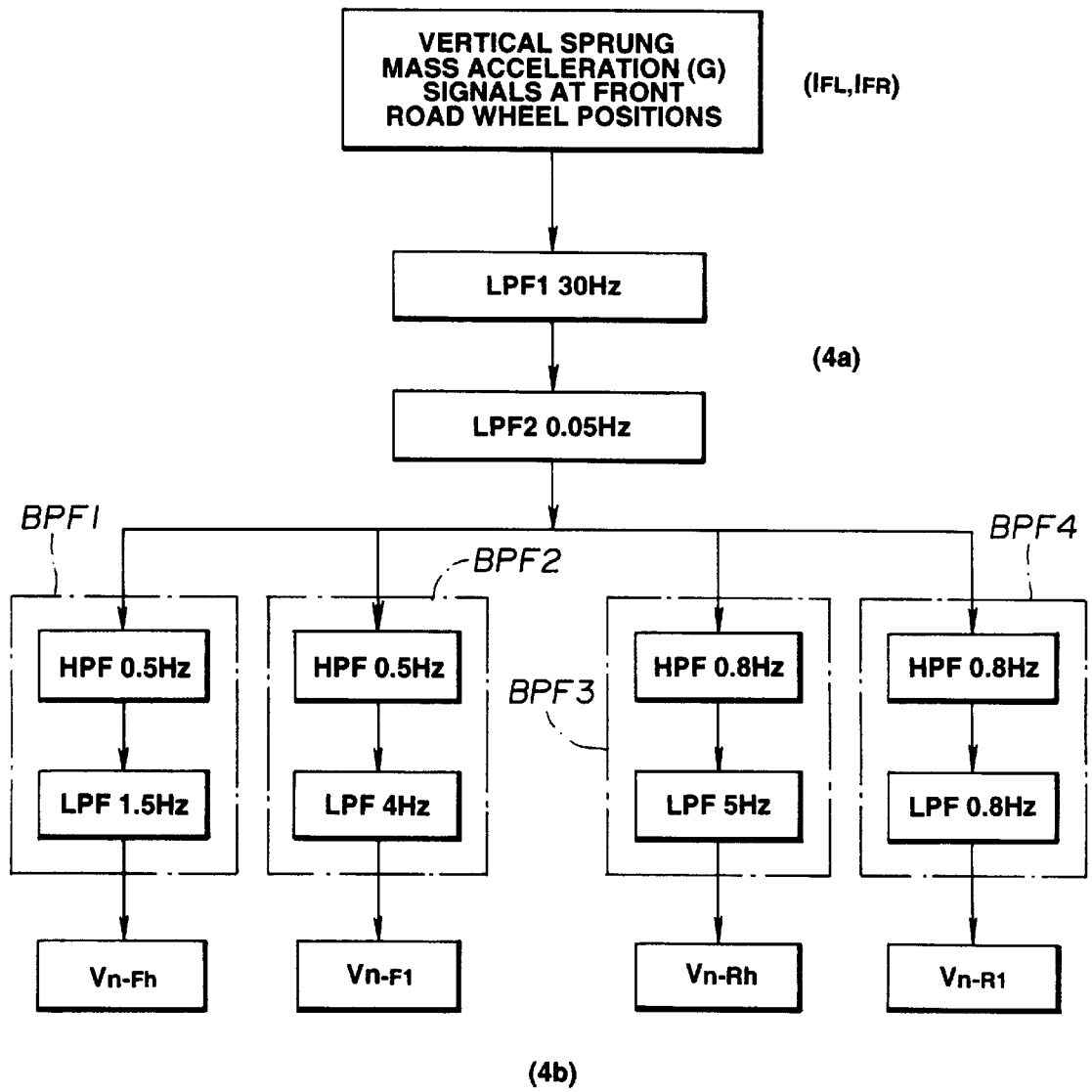
FIG. 21A is a circuit block diagram of the damping force characteristic controlling apparatus in a third preferred embodiment.
Figure 21B:
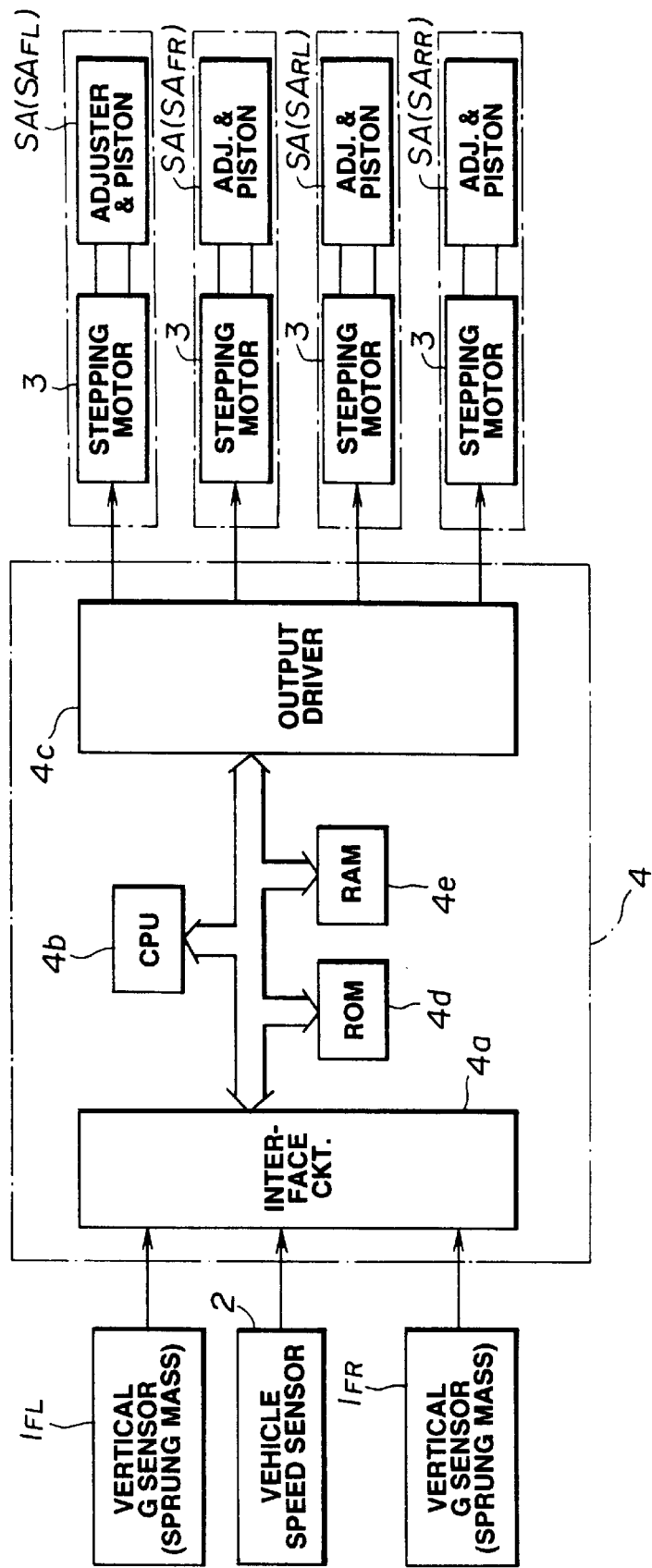
FIG. 21B is a circuit block diagram of another signal processing circuit in the third embodiment shown in FIG. 21A.

FIG. 21A shows the circuit block diagram of the damping force characteristic controlling apparatus in a third embodiment according to the present invention and FIG. 21B shows the signal processing circuit of the interface circuit and derivation of the front left and right and rear left and right control signals from the signal processing circuit passed signals in a third preferred embodiment according to the present invention.

In the third embodiment, four series-connected band pass filters BPF1, BPF2, BPF3, and BPF4 are installed. The first low-pass filter LPF1 has the cut-off frequency of 30 Hz. The second low-pass filter LPF2 has the cut-off frequency of 0.05 Hz. These filters functions are the same as those described in the first embodiment.

A first band pass filter BPF1 shown in FIG. 21A is a band pass filter to derive the front road wheel side sprung mass vertical velocity $V_n$ ($V_{n-Fh}$) for the controls of the front road wheel side shock absorbers $SA_{FL}$ and $SA_{FR}$ when the vehicle speed falls in a high speed range and is constituted by a high pass filter HPF having the cut-off frequency of 0.5 Hz and a low pass filter having the cut-off frequency of 1.5 Hz.

A second band pass filter BPF2 shown in FIG. 21A is a band pass filter to derive the front road wheel side sprung mass vertical velocity $V_n$ ($V_{n-F1}$) for the controls of the front road wheel side shock absorbers $SA_{FL}$ and $SA_{FR}$ when the vehicle speed falls in a low speed range and is constituted by a high pass filter LPF having the cut-off frequency of 0.5 Hz and a low pass filter LPF having the cut-off frequency of 4 Hz.

Figure 22:
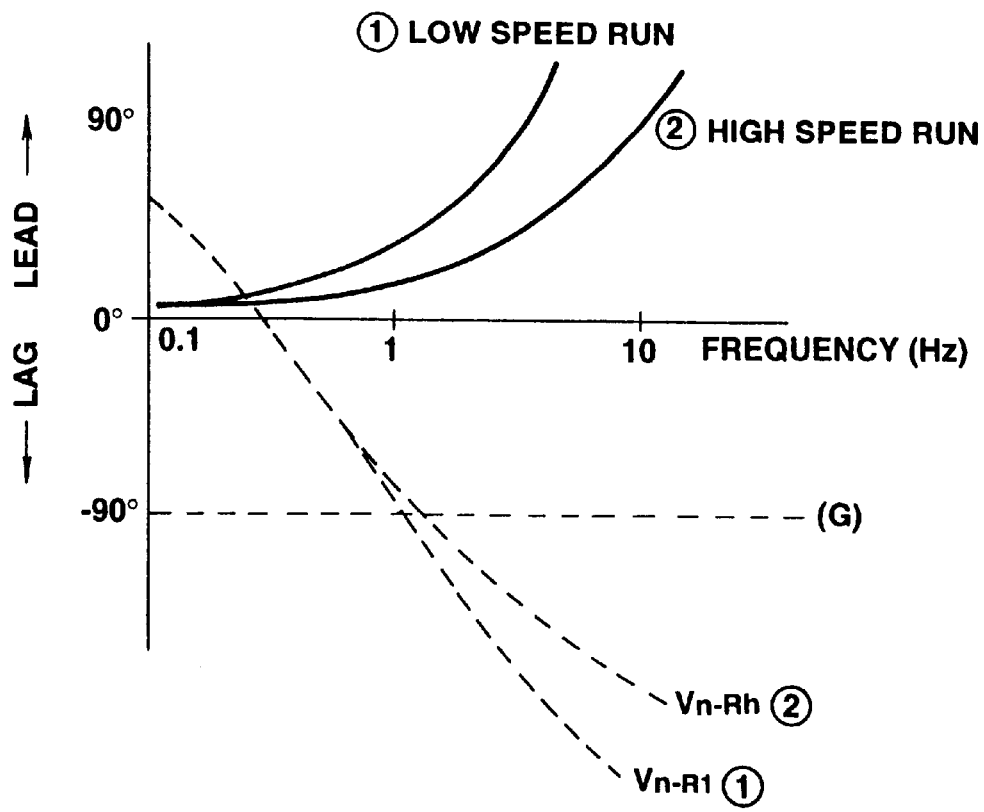
FIG. 22 is characteristic graphs representing the phase relationships between each signal and input signal frequency in the case of the third embodiment.

A third band pass filter BPF3 shown in FIG. 21A is a band pass filter to derive the rear road wheel side sprung mass vertical velocity $V_n$ ($V_{n-Rh}$) for the controls of the rear road wheel side shock absorbers $SA_{RL}$ and $SA_{RR}$ when the vehicle speed falls in the high speed range and is constituted by a high pass filter HPF having the cut-off frequency of 0.8 Hz and a low pass filter having the cut-off frequency of 5 Hz (refer to the phase characteristic denoted by a dotted line of ② of FIG. 22).

A fourth band pass filter BPF4 shown in FIG. 21A is a band pass filter to derive the rear road wheel side sprung mass vertical velocity $V_n$ ($V_{n-R1}$) for the controls of the rear road wheel side shock absorbers $SA_{RL}$ and $SA_{RR}$ when the vehicle speed falls in the low speed range and is constituted by a high pass filter having the cut-off frequency of 0.8 Hz and a low-pass filter having the cut-off frequency of 0.8 Hz (refer to the phase characteristic denoted by a dotted line of ① of FIG. 22).

That is to say, FIG. 22 shows phase characteristics of the respective signals with respect to the input signal frequency.

As shown in FIG. 22, the solid lines ① and ② shown in FIG. 22 denote phase characteristics of the respective signals with respect to the input signal frequency when the vehicle runs at the high speed and when the vehicle runs at the low speed, the solid line ① indicating the phase advance of the sprung mass vertical acceleration signal detected at the front road wheel side with respect to the phase of the sprung mass vertical acceleration signal to be detected at the rear road wheel side and the phase advance quantity being the function of the vehicle speed and the solid line ② indicating the phase advance of the sprung mass vertical acceleration signal detected at the front road wheel side with respect to the sprung mass vertical acceleration signal detected at the rear road wheel side to be detected at the rear road wheel side and the phase advance quantity being the function of the vehicle speed.

In the third embodiment, since the higher frequency components become increased as the vehicle speed falls in the lower speed range, the signal processed band pass filter BPF1 having the narrower cut-off frequency band for the high speed range is switched to the signal processed band pass filter BPF2 having the higher cut-off frequencies for the low speed range when the vehicle speed falls in the low speed range to appropriately derive the control signals for the front road wheel side shock absorbers $SA_{FL}$ and $SA_{FR}$. On the other hand, since the switching between the low speed controlling fourth band pass filter BPF4 by which the processed signal having the phase characteristic denoted by the dotted line of ① shown in FIG. 22 is derived and the high speed band pass filter BPF3 by which the phase characteristic of the processed signal denoted by the dotted line of ② is carried out at a predetermined vehicle speed value, the variation of the phase advanced state of the front road wheel sprung mass vertical acceleration signal detected at the front road wheel side with respect to the phase to be detected at the rear road wheel side due to the vehicle speed can be corrected.

As described above, the more vehicular comfort can be improved.

Although, in the third embodiment, the pair of front road wheel side sprung mass vertical acceleration sensors $I_{FL}$ and $I_{FR}$ are used in the same way as in the case of the first embodiment, the damping force characteristic controlling apparatus in the third embodiment can be achieved using only one sprung mass vertical acceleration sensor $I_{FC}$ located at the center position of the front road wheel side shock absorbers as in the case of the second embodiment.

(Fourth Embodiment)

Figure 23:
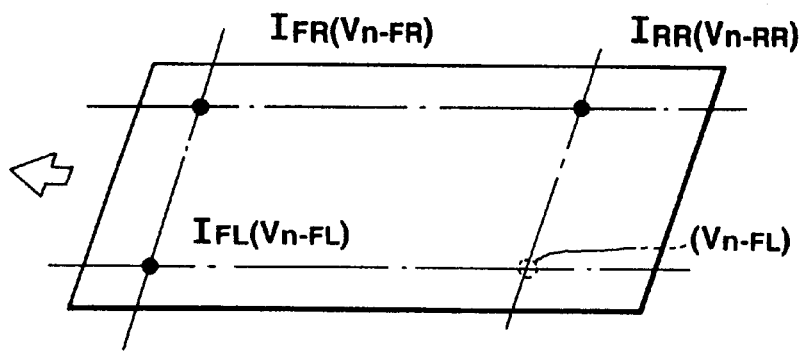
FIG. 23 is an explanatory top view of the vehicle in which three sprung mass vertical acceleration sensors are mounted in a case of a fourth preferred embodiment.

FIG. 23 shows an arrangement of three sprung mass vertical acceleration sensors mounted on the vehicular body in a case of a fourth preferred embodiment.

Figure 24:
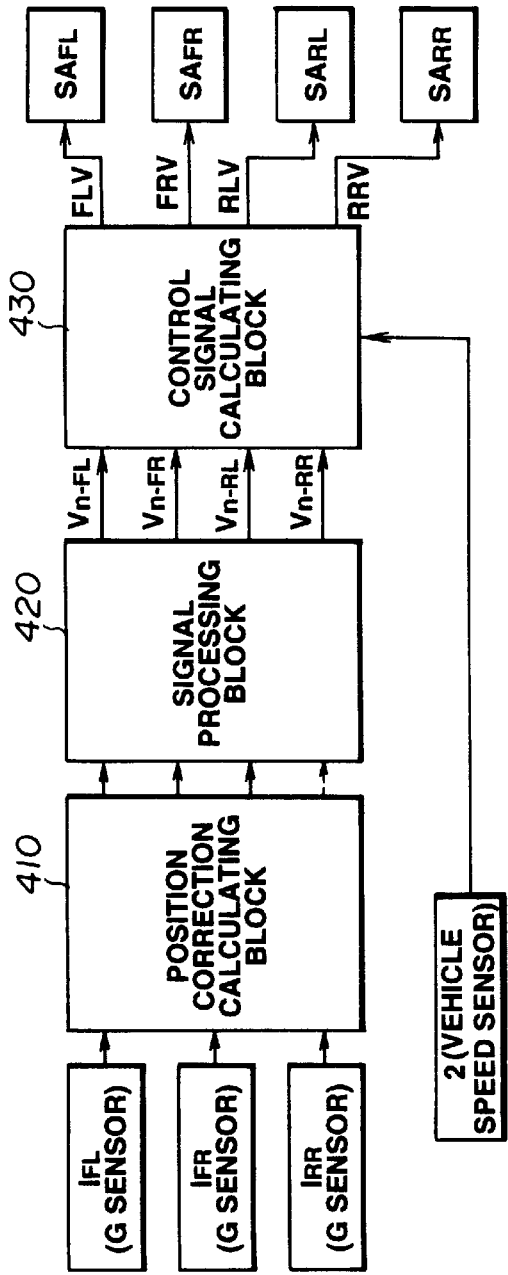
FIG. 24 is a circuit block diagram of the damping force characteristic controlling apparatus in the fourth embodiment shown in FIG. 23.

FIG. 24 shows a schematic circuit block diagram of a vehicular damping force characteristic controlling apparatus in the forth embodiment.

As shown in FIGS. 23 and 24, another sprung mass vertical acceleration sensor $I_{RR}$ is installed on the given part of the vehicular body on which the rear right road wheel side shock absorber $SA_{RR}$ is suspended in addition to the sprung mass vertical acceleration sensors $I_{FR}$ and $I_{FL}$ described in the case of the first embodiment.

Furthermore, the vehicle speed sensor 2 which is constructed as to detect the vehicle speed is connected to a control signal calculating block 430.

The damping force characteristic controls for the front road wheel side shock absorbers $SA_{FL}$ and $SA_{FR}$ are carried out on the basis of the control signals FLV and FRV formed by means of the sprung mass vertical velocity signals $V_{n-FL}$ and $V_{n-FR}$ at the front road wheel sides derived from the front road wheel side vertical sprung mass G sensors $I_{FL}$ and $I_{FR}$. On the other hand, the damping force characteristic controls for the rear left and right road wheel side shock absorbers $SA_{RL}$ and $SA_{RR}$ are carried out on the basis of the control signals RLV and RRV formed by the rear right road wheel side sprung mass vertical velocity $V_{n-RR}$ derived from the rear road wheel side sprung mass vertical acceleration sensor $I_{RR}$ and a calculated rear left road wheel side sprung mass vertical velocity $V_{n-RL}$ at the rear road wheel side, respectively, when the vehicle speed detected by the vehicle speed sensor 2 indicates a low speed (lower than 30 Km/h). When the vehicle speed detected by the vehicle speed sensor 2 indicates a high speed (30 Km/h to 120 Km/h), each of the front road wheel side sprung mass vertical velocity signals $V_{n-RL}$ and $V_{n-RR}$ is synthesized with the corresponding one of the front road wheel side sprung mass vertical velocity signals $V_{n-FL}$ and $V_{n-FR}$, a rate of synthesis of both signals being such that as the vehicle speed increases the rate of synthesis of the front road wheel side sprung mass vertical velocity signal $V_{n-FL}$ and $V_{n-FR}$ to the other rear road wheel side sprung mass velocity signal $V_{n-RL}$ and $V_{n-RR}$, as shown in a gain characteristic graph of FIG. 25, the rear road wheel side sprung mass vertical velocity $V_{n-RL}$ and $V_{n-RR}$ being accordingly reduced.

The above-described control signals FLV, FRV, RLV, and RRV are as follows:

$$FLV = \kappa_f V_{n-FL},$$

$$FRV = \kappa_f V_{n-FR},$$

$$RLV = \kappa_r \cdot V_{n-FL} + (1-\kappa_r) V_{n-RL},$$

$$RRV = \kappa_r \cdot V_{n-FR} + (1-\kappa_r) V_{n-RR} \qquad (4).$$

Figure 25:
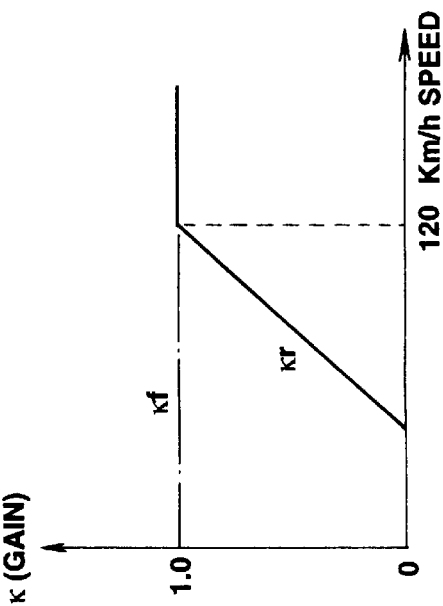
FIG. 25 is a gain characteristic graph with respect to a vehicle speed in the case of the fourth embodiment shown in FIGS. 23 and 24.

It is noted that $\kappa_f$ denotes the front wheel side gain and is set to 1 as shown in FIG. 25, and $\kappa_r$ denotes a rear road wheel side gain and is set so as to be variable as a function of the vehicle speed.

The control unit 4, in the fourth embodiment, comprises a position correction calculating block 410, a signal processing block 420 used to derive the signals having the frequency dependent characteristics including the speed conversion, and the control signal calculating block 430, as shown in FIG. 24.

Hence, in the fourth embodiment, when the vehicle runs at the low speed such that the sprung mass behaves mainly as the pitching motion and low frequency components of the sprung mass accelerations are increased, both of the front road wheel side and rear road wheel side shock absorbers $SA_{FL}$ through $SA_{RR}$ are independently controlled so as to maintain the vehicular pitching motion suppression.

On the other hand, when the vehicle runs at the high speed such that the sprung mass behaves mainly as the bouncing motion and the higher frequency components are increased, the damping force characteristic controls for the front road wheel side shock absorbers are carried out on the basis of the control signals based mainly on the sprung mass vertical velocity signals $V_{n-FL}$ and $V_{n-FR}$ derived at the front road wheel side so that the same advantages as in the case of the first embodiment can be achieved. In addition to this, since the rate of signal synthesis is the function of the vehicle speed, a more precise control for the rear road wheel side shock absorbers $SA_{RL}$ and $SA_{RR}$ can be carried out.

Although, in the fourth embodiment, the sprung mass vertical G sensors includes the pair of front left and right sprung mass vertical G sensors $I_{FL}$ and $I_{FR}$ and the rear right road wheel side vertical G sensor $I_{RR}$ located at the rear right road wheel side, the sprung mass vertical G sensors may include a single front center sprung mass vertical acceleration sensor located at the center between the front left and right road wheel sides and a single rear center sprung mass vertical acceleration sensor located at the center between the rear left and right road wheel sides.

Although in the first, second, third, and fourth embodiments, the sprung mass vertical G sensor(s) are used as the vertical behavior detecting means, either such a sensor(s) as to detect a relative displacement between the sprung mass and unsprung mass or a combination thereof or either such as a sensor(s) as to detect the relative velocity between the sprung mass and unsprung mass or the combination thereof may be used.

Although, in the first, second, third, and fourth embodiments, the shock absorbers $SA_{FL}$ through $SA_{RR}$ are used in which one of the stroke sides is controlled to provide the hard damping force while the other stroke side is fixed to the soft damping force characteristic, such shock absorbers that both extension and compression stroke sides are controlled simultaneously and in the same directions may alternatively be used.

Although, in the third embodiment, two types of the band pass filters BPF1 and BPF2 or BPF3 and BPF4 are switched in accordance with the vehicle speed, three or more types of the band pass filters may be disposed to enhance the control effects.

Although, in the fourth embodiment, the rate of signal synthesis of the front road wheel side sprung mass vertical velocities $V_{n-FL}$ and $V_{n-FR}$ to the sprung mass vertical velocity signals $V_{n-RL}$ and $V_{n-RR}$ derived at the rear road wheel side is the function of the vehicle speed, the rear left and right road wheel side shock absorbers $SA_{RL}$ and $SA_{RR}$ may be controlled on the basis of the control signals based on the front road wheel side sprung mass vertical velocity signals $V_{n-FL}$ and $V_{n-FR}$.

(Fifth Embodiment)

Figure 26:
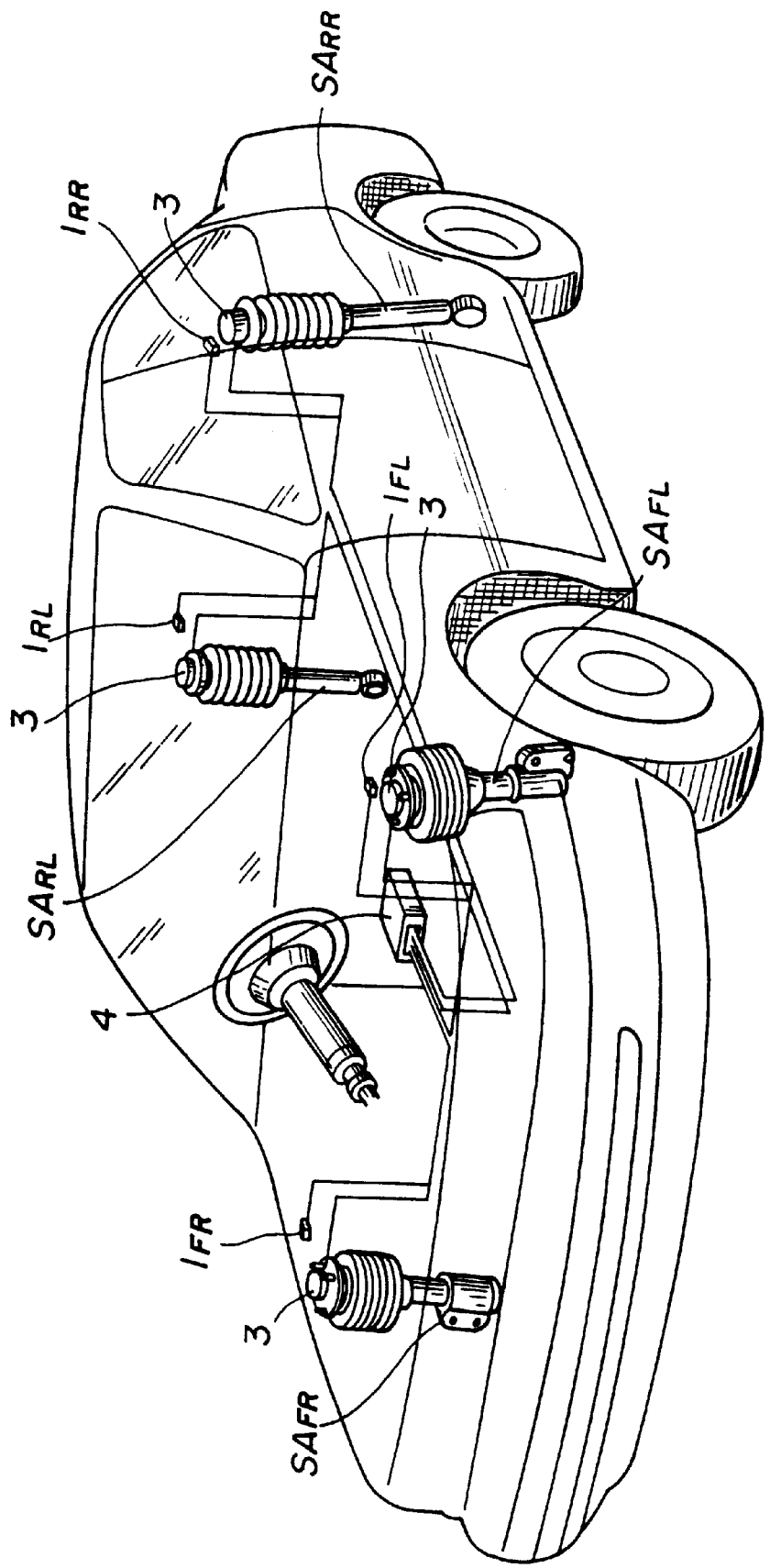
FIG. 26 is an explanatory view of the damping force characteristic controlling apparatus in a case of a fifth preferred embodiment.
Figure 27:
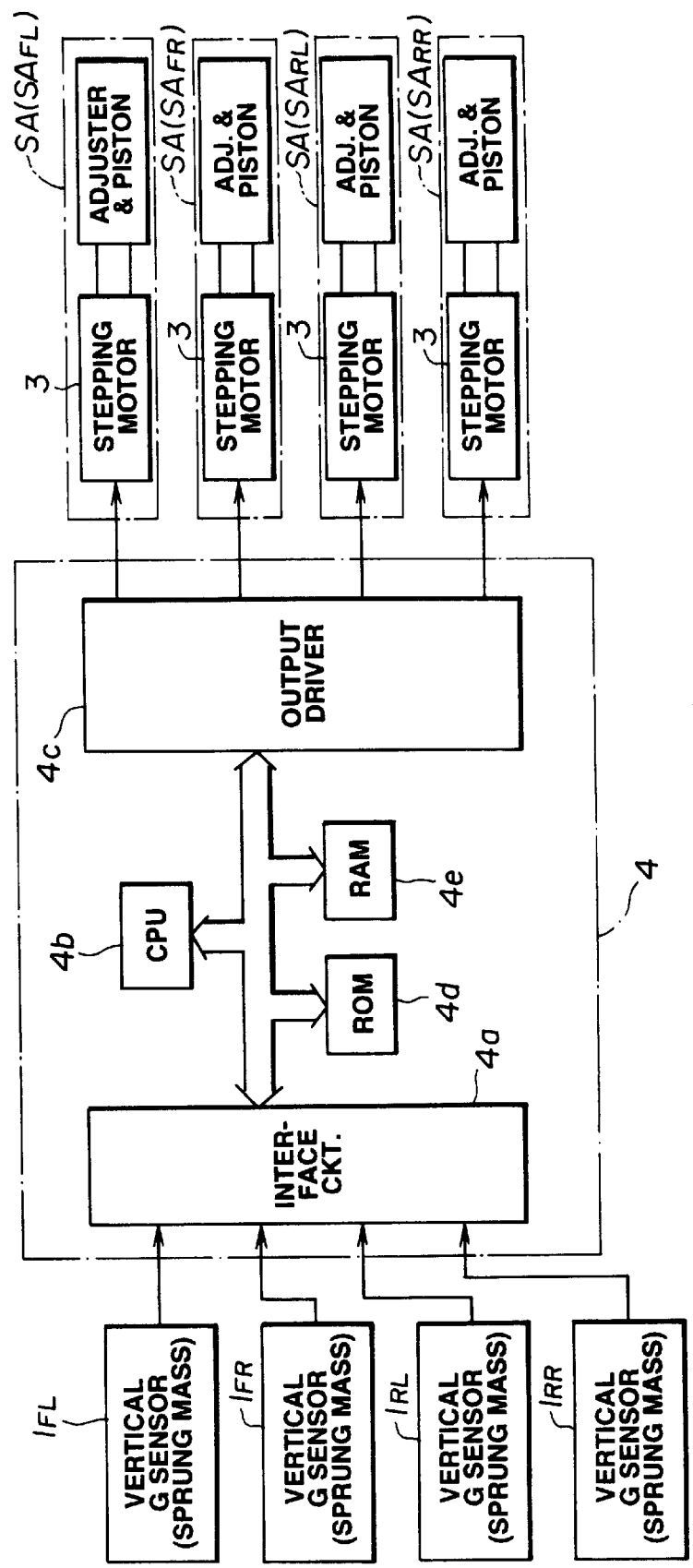
FIG. 27 is a schematic circuit block diagram of the damping force characteristic controlling apparatus in the case of the fifth embodiment shown in FIG. 26.

FIG. 26 shows the damping force characteristic controlling apparatus in a fifth preferred embodiment and FIG. 27 shows the schematic circuit block diagram of the damping force characteristic controlling apparatus in the fifth embodiment.

In the fifth embodiment, the rear left and right road wheel acceleration sensors $I_{RL}$ and $I_{RR}$ are newly added to detect the sprung mass vertical accelerations located at the rear left and right road wheel sides as compared with the first embodiment. The other structures of the apparatus is generally the same as those in the first embodiment.

Figure 28:
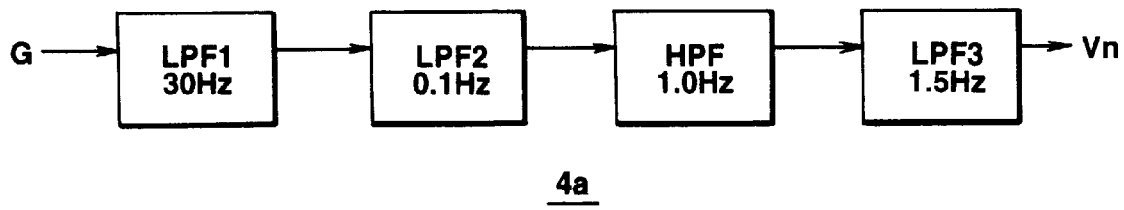
FIG. 28 is a schematic circuit block diagram of another signal processing circuit in the fifth embodiment shown ion FIGS. 26 and 27.

FIG. 28 shows the representative signal processing circuit in the interface circuit shown in FIG. 27. The arrangement of the signal processing circuit is generally the same as that shown in FIG. 14.

However, the second low pass filter LPF1 has the cut-off frequency of 0.1 Hz. the high pass filter HPF has the cut-off frequency of 1.0 Hz, and the third low pass filter LPF3 has the cut-off frequency of 1.5 Hz.

Figure 29:
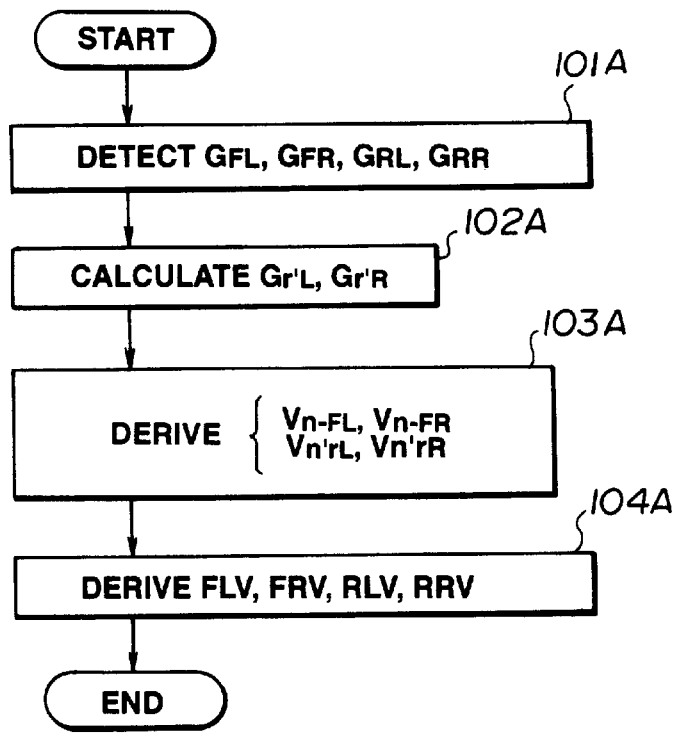
FIG. 29 is an operational flowchart representing a control signal driving routine in the case of the fifth embodiment.

FIG. 29 shows the operational flowchart executed by the CPU 4b in the fifth embodiment to derive the control signal V (FLV, FRV, RLV, and RRV).

At a step 101A, the CPU 4b fetches data on the sprung mass vertical accelerations at the respective road wheel sides ($G_{FL}$, $G_{FR}$, $G_{RL}$, and $G_{RR}$) from the respective sprung mass vertical acceleration sensors ($I_{FL}$, $I_{FR}$, $I_{RL}$, and $I_{RR}$).

Figure 30:
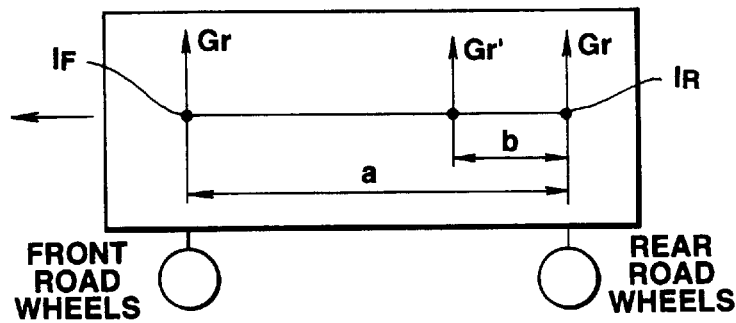
FIG. 30 is an explanatory side view of the vehicle for explaining a derivation of a sprung mass vertical acceleration at a part of the vehicular body which is remote from the rear road wheel portions by b in the case of the fifth embodiment.

At a step 102A, the CPU 4b calculates the sprung mass vertical acceleration $G'_r$ ($G'_{rL}$, $G'_{rR}$) at a position of the vehicular body which is forward by a predetermined length b denoted in FIG. 30 with respect to the rear road wheel position from the front road wheel side sprung mass vertical acceleration $G_F$ ($G_{FL}$ and $G_{FR}$) and the rear road wheel side sprung mass vertical acceleration $G_R$ ($G_{RL}$, $G_{RR}$) on the basis of the following equation (5).

$$G'_r = G_R + b/a(G_F - G_R) \qquad (5),$$

wherein symbol a denotes a wheel base length.

At a step 103A, the CPU 4b integrates the four sprung mass vertical acceleration signals $G_{FL}$, $G_{FR}$, $G'_{rL}$, and $G'_{rR}$ to convert them into the sprung mass vertical velocity signals and render the sprung mass vertical velocity signals pass through the band pass filter BPF of the high pass filter and third low pass filter shown in FIG. 28 to derive the sprung mass vertical velocity signals $V_n$ ($V_{n-FL}$, $V_{n-FR}$, $V'_{nL}$, $V'_{nR}$) including the sprung mass resonance frequency components.

At a step 104A, the CPU 4b derives the control signal V for each shock absorber SA using the following equations (6).

$$FLV = \alpha_f V_{n-FL},$$

$$FRV = \alpha_f V_{n-FR},$$

$$RLV = \alpha_r \cdot V'_{nRL},$$

$$RRV = \alpha_r \cdot V'_{nrR} \quad (6).$$

Then, the routine is ended and returns to the step 101A of FIG. 29.

The control signals for the rear road wheel side shock absorbers RLV and RRV are derived according to the input sprung mass velocity signals V'$_{nrL}$ and V'$_{nR}$ of the position located in front of a line (generally called a tread) connecting both rear left and right road wheels) so that the control signals V which have corrected the phase deviations due to the signal processing can be derived.

The same advantages as those in the case of the first embodiment can be achieved by the fifth embodiment.

The damping force control routine as the first embodiment shown in FIG. 17 is carried out in the case of the fifth embodiment.

(Sixth Embodiment)

Figure 31:
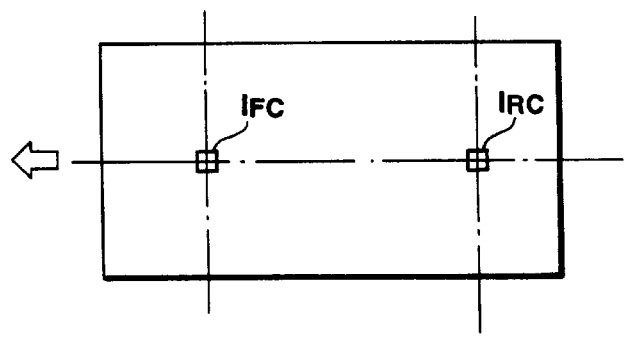
FIG. 31 is an explanatory top view of the vehicle in which two sprung mass vertical acceleration sensors are arranged in a case of sixth preferred embodiment.

FIG. 31 shows a sixth preferred embodiment of the damping force characteristic controlling apparatus according to the present invention.

A pair of sprung mass vertical acceleration sensors I$_{FC}$ and I$_{RC}$ are installed on the respective center positions (FC and RC of FIG. 31) of the vehicular body with respect to the respective lines connecting both front left and right road wheels and rear left and right road wheels.

In the sixth preferred embodiment, the control signal V is calculated on the basis of the sprung mass vertical velocity signal V$_{n-FC}$ at the center position of the vehicular body between the front road wheels derived from the front side sprung mass vertical acceleration signal I$_{FC}$ and is used to control the damping force characteristics of the front left and right road wheel side shock absorbers SA$_{FL}$ and SA$_{FR}$. On the other hand, the control unit 4*b* calculates the sprung mass vertical velocity signal V'$_{n-RC}$ located at the center position which is forward by the predetermined length b with respect to the line connecting both rear left and right road wheels from the sprung mass vertical velocity signal V$_{n-RC}$ at the center position of the vehicular body between the rear left and right road wheels and carries out the damping force characteristic controls of the rear road wheel side shock absorbers SA$_{RL}$ and SA$_{RR}$.

As compared with the structure of the damping force characteristic controlling apparatus in the fifth embodiment, the number of sensors of the sprung mass vertical acceleration sensors are two so that the cost of assembling the apparatus in the vehicle can be reduced.

(Seventh Embodiment)

Figure 32:
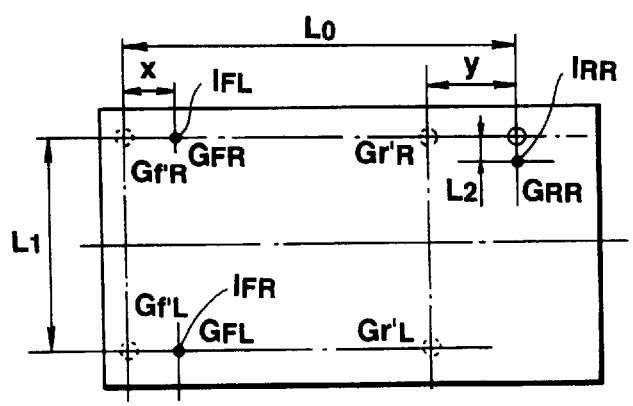
FIG. 32 is an explanatory top view of the vehicle in which three sprung mass vertical acceleration sensors are arranged in a case of a seventh preferred embodiment.

FIG. 32 shows the arrangement of sensors in a case of a seventh preferred embodiment of the damping force characteristic controlling apparatus.

Figure 33:
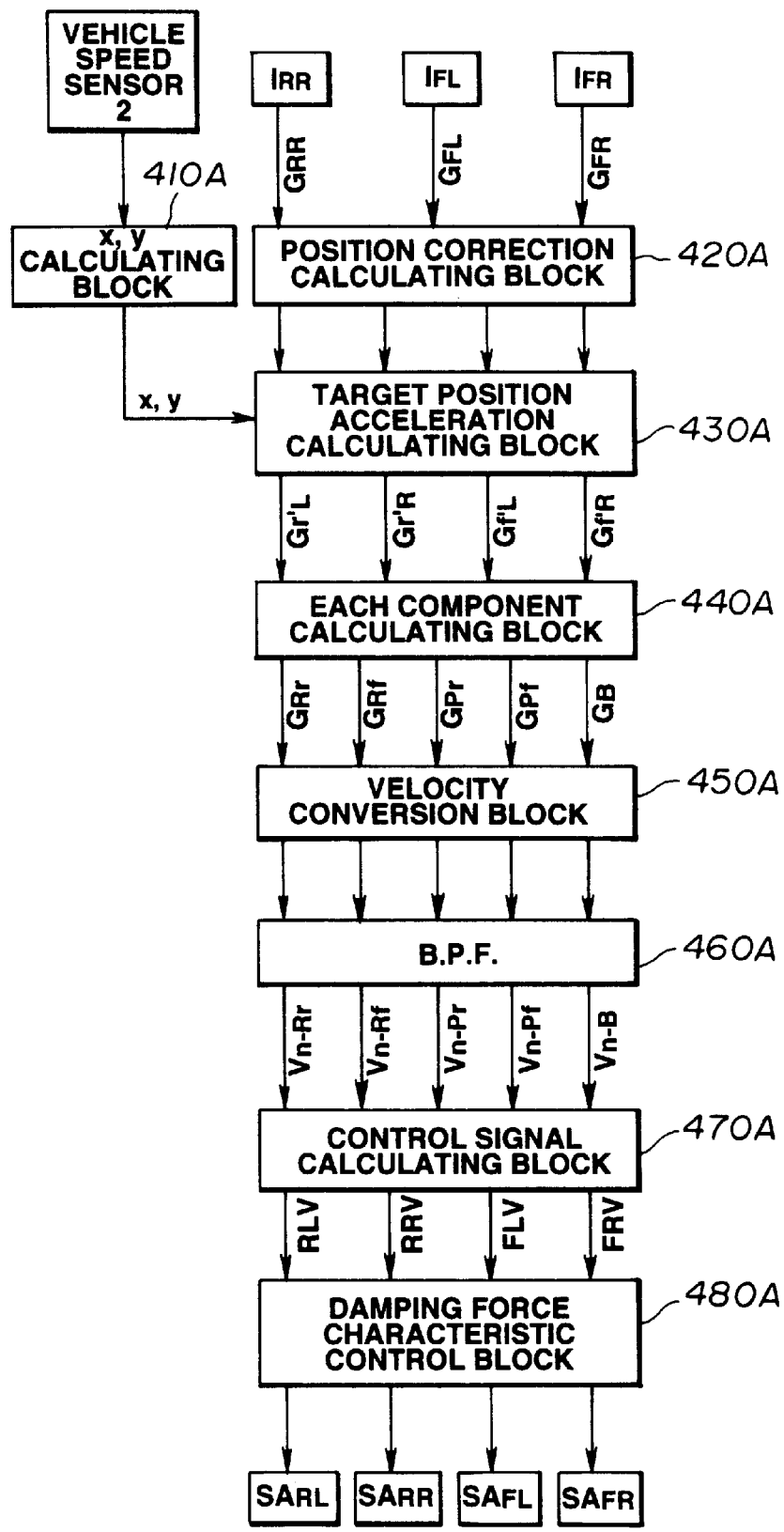
FIG. 33 is a schematic circuit block diagram of the damping force characteristic controlling apparatus in the seventh embodiment shown in FIG. 32.

FIG. 33 shows a schematic circuit block diagram of the damping force characteristic controlling apparatus in the seventh embodiment.

In the seventh embodiment, the pair of the left and right sprung mass vertical acceleration sensors I$_{FL}$ and I$_{FR}$ are mounted on the given parts of the vehicular body which are remote in the rearward direction by a distance x from the corresponding one of the front left and front right road wheel sides denoted by dotted circles of FIG. 32 and the sprung mass vertical acceleration sensor I$_{RR}$ to detect the sprung mass acceleration at the position of the vehicular body which is located at the rear right road wheel side is installed. The CPU 4*b* in the seventh embodiment calculates four values of four point detection target positions on the vehicular body, i.e., sprung mass vertical acceleration signals G'$_{fL}$ and G'$_{fR}$ at the front left and right road wheel sides denoted by the dotted circles of FIG. 32 and sprung mass vertical acceleration signals G'$_{rL}$ and G'$_{rR}$ of the parts of the vehicular body which are in front of the rear left and right road wheel sides by a given distance denoted by y of FIG. 32.

The distance y is moved in the forward direction in proportion to the vehicle speed.

The control unit 4 includes an x-y position calculating block 410A; a position correction calculating block 420A; a target position acceleration calculating block 430A; a each component calculating block 440A; a velocity conversion block 450A; a band pass filter 460A; a control signal calculating block 470A; and a damping force characteristic control block 480A.

Figure 34:
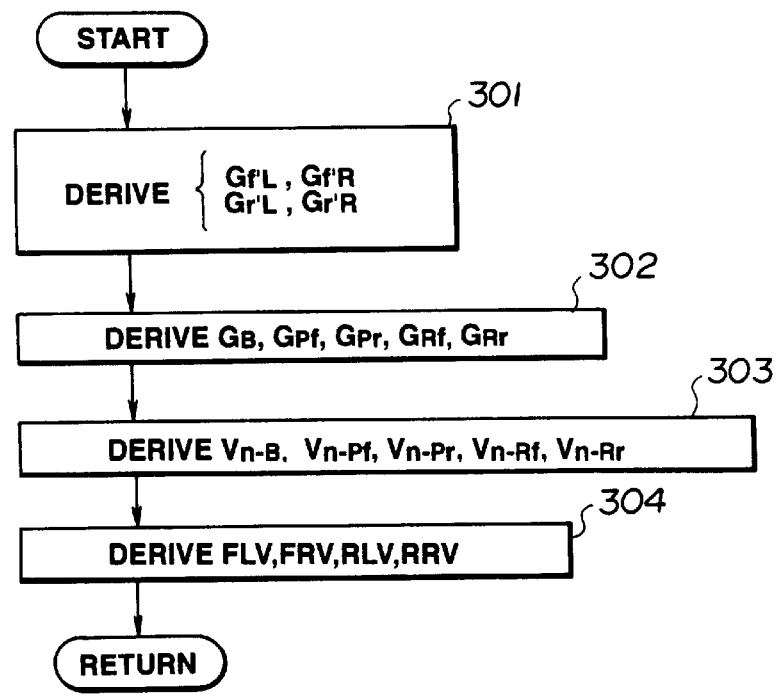
FIG. 34 is an operational flowchart representing a control signal deriving routine in the case of the seventh embodiment shown in FIGS. 32 and 33.

FIG. 34 shows a control routine representing the derivation of the control signals V.

At a step 301, the CPU 4*b* calculates the front road wheel side sprung mass vertical acceleration signals G'$_{rL}$ and G'$_{rL}$ from the three point sprung mass vertical acceleration signals G$_{FL}$, G$_{FR}$, and G$_{RR}$ on the vehicular body from the three point located sprung mass vertical G sensors I$_{FL}$, I$_{FR}$ and I$_{RR}$ and calculates the rear road wheel side sprung mass vertical accelerations G'$_{rL}$ and G'$_{rR}$ at the front position by the distance y from the rear road wheel position.

At a step 301, the CPU 4*b* derives G'$_{fL}$, G'$_{fR}$, G'$_{rL}$, and G'$_{rR}$ using the following equations (7):

$$G'_{fL} = \frac{x(L_1 - L_2)}{L_0 \cdot L_1} G_{fR} + \left(1 + \frac{L_2 \cdot x}{L_0 \cdot L_1}\right) G_{FL} - \frac{x}{L_0} G_{RR}$$

$$G'_{fR} = \left(1 + \frac{L_1 - L_2}{L_0 \cdot L_1} \cdot x\right) G_{FR} + \frac{L_2 \cdot x}{L_0 \cdot L_1} G_{FL} - \frac{x}{L_0} G_{RR}$$

$$G'_{rL} = \frac{(L_0 - L_2)(L_0 - y)}{L_0 \cdot L_1} G_{FR} + \frac{y \cdot L_1 + (L_1 - L_2)(L_0 - y)}{L_0 \cdot L_1} G_{FL} + \frac{L_0 - y}{L_0} G_{RR}$$

$$G'_{rR} = \frac{(L_1 - L_2)y + L_2 \cdot L_0}{L_0 \cdot L_1} G_{FR} + \frac{L_2(L_0 - y)}{L_0 \cdot L_1} G_{FL} + \frac{L_0 - y}{L_0} G_{RR}$$

In the equations (7), L$_o$ denotes a wheel base length, L$_1$ denotes the tread (the tread means the distance between the center points of contact with the ground of the two front wheels or the two rear wheels of the vehicle), and L$_2$ denotes a distance in the vehicular width direction from the position on which the rear right road wheel side sprung mass vertical G sensor I$_{RR}$ is mounted.

The above-described x and y are the first-order function to the vehicle speed. As the vehicle speed increases, the target positions are moved forward.

$$x = \kappa_f \cdot speed + x_o,$$

$$y = \kappa_r \cdot speed + y_o \quad (8).$$

In the equations (8), $\kappa_f$ and $\kappa_r$ denotes initial values of x and y, respectively.

At a step 302, the CPU 4*b* derives the vehicular bouncing component G$_B$, pitching components G$_{pf}$, G$_{pr}$, and rolling components G$_{Rf}$ and G$_{Rr}$ on the basis of the following equations (9) from the calculated sprung mass vertical accelerations G'$_{fL}$ and G'$_{fR}$ and calculated sprung mass vertical accelerations G'$_{rL}$ and G'$_{rR}$ at the respective target positions.

$$G_B = (G'_{fL} + G'_{fR} + G'_{rL} + G'_{rR})/4,$$

$$G_{Pf}=((G'_{fL}+G'_{fR})-(G'_{rL}+G'_{rR}))/4,$$

$$G_{Pr}=((G'_{rL}+G'_{rR})-(G'_{fL}+G'_{fR}))/4,$$

$$G_{Rf}=(G'_{fR}-G'fL)/2=G_{Rr} \qquad (9).$$

At a step 303, the CPU 4b integrates the respective sprung mass vertical acceleration signal components of $G_B$, $G_{Pf}$, $G_{Pr}$, $G_{Rf}$, and $G_{Rf}$ caused by the sprung mass vertical accelerations to be converted into the bouncing component $V_{n-B}$, pitching components $V_{n-Pf}$ and $V_{n-Pr}$, and rolling components $V_{n-Rf}$ and $V_{n-Rr}$, respectively.

The band pass filter BPF is constituted by the high pass filter having the cut-off frequency of 0.5 Hz and the third low pass filter having the cut-off frequency of 2.5 Hz to filter the respective bouncing, pitching, and rolling components so as to eliminate unnecessary signal components.

At a step 304, the control signals V for the respective shock absorbers SA are calculated on the basis of the following equations (9).

$$FLV=\alpha_f V_{n-B}+\beta_f V_{n-Rf}+\gamma_f V_{n-Rf},$$

$$FRV=\alpha_f V_{n-B}+\beta_f V_{n-Pf}-\gamma_f V_{n-Rf},$$

$$RLV=\alpha_r \cdot V_{n-B}+\beta_r \cdot V_{n-Pr}+\gamma_r \cdot V_{n-Rr},$$

and $$RRV=\alpha_r \cdot V_{n-B}+\beta_r \cdot V_{n-Pr}-\gamma_r \cdot V_{n-Rr}.$$

In the equations (9), $\alpha_f$, $\beta_f$, and $\gamma_f$ denote proportional constants of the front road wheel sides and $\alpha_r$, $\beta_r$, and $\gamma_r$ denote proportional constants of the rear road wheel sides.

It is of course that when the step 304 is ended, the routine returns to the step 301, in the same way as in the case of the first embodiment.

FIGS. 25A and 25B show the sprung mass vertical velocity signal timing charts in the case of the seventh embodiment according to the vehicle speed.

Figure 35A:
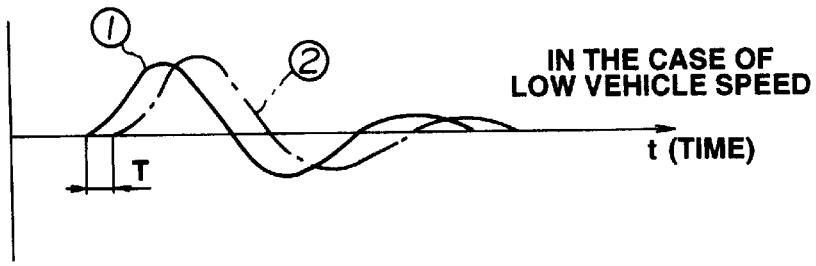
FIGS. 35A and 35B are characteristic graphs presenting phase lag states of the vertical sprung mass velocity signal at the rear road wheel position with respect to the vertical sprung mass velocity signal at the front road wheel position, FIG. 35A indicating those when the vehicle runs at a high speed and FIG. 35B indicating those when the vehicle runs at a low speed.
Figure 35B:
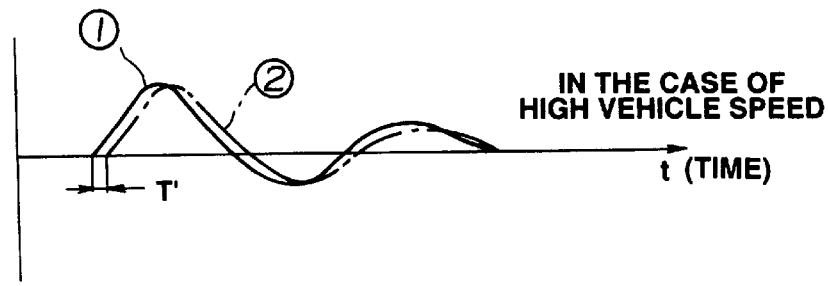

When the vehicle runs on a recess and convex of a road surface, the phase advance quantities T and T' of the sprung mass vertical velocity signal @D at the front road wheel side (denoted by the solid lines of FIGS. 35A and 35B) with respect to the sprung mass vertical velocity signal ② (denoted by a dot-and-dash line at the front road wheel side become smaller as the vehicle speed becomes higher.

Figure 36:
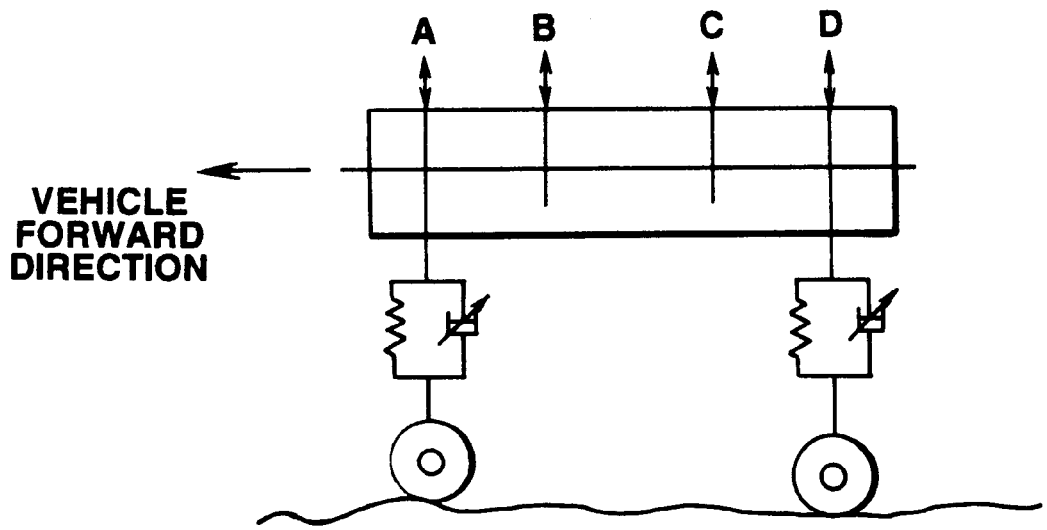
FIG. 36 is an explanatory view representing the detected position of the sprung mass vertical velocity as viewed from a vehicular body side for explaining the operation in the seventh embodiment.
Figure 37:
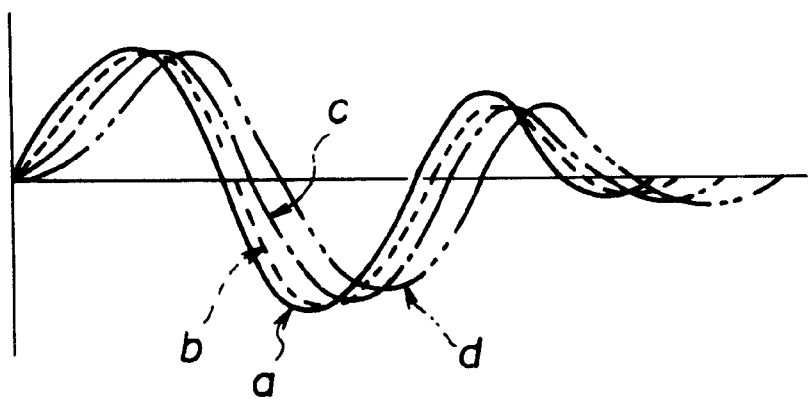
FIG. 37 is characteristic graphs representing phase lag states of the respective sprung mass vertical velocity signals at the respective sprung mass vertical velocity detecting positions in the case of the seventh embodiment shown in FIG. 36.

FIG. 36 shows the sprung mass vertical velocity signal detected positions A, B, C, and D on the given parts of the vehicular body and FIG. 37 shows phase delay states of the sprung mass vertical velocity signals a, b, c, and d at the detected positions of A, B, C, and D viewed from the vehicular body left side.

As the position of the vehicular body approaches to the front end shown in FIG. 36, the phase advance quantity of the signal at the predetermined forward position with respect to the rear road wheel side becomes large (A denotes the front road wheel position) becomes large. Therefore, the predetermined forward position to the rear road wheel position is moved in the forward direction in proportion to the vehicle speed so that the correction to eliminate the variation of the phase delay due to the variation in the vehicle speed can be made. Consequently, even if the vehicle speed is varied, the vehicular comfort can be improved.

Although the seventh embodiment recites that the three sprung mass vertical acceleration sensors are mounted as denoted by $I_{FL}$, $I_{FR}$, and $I_{RR}$ shown in FIG. 32, the two sprung mass vertical acceleration sensors may be mounted as in the case of the sixth embodiment shown in FIG. 31.

It is noted that the sprung mass vertical acceleration sensor(s) which is arranged for directly detecting the sprung mass vertical acceleration at the forward target point of the vehicular body by the distance y from the rear road wheel position may be used.

(Eighth Embodiment)

Figure 38:
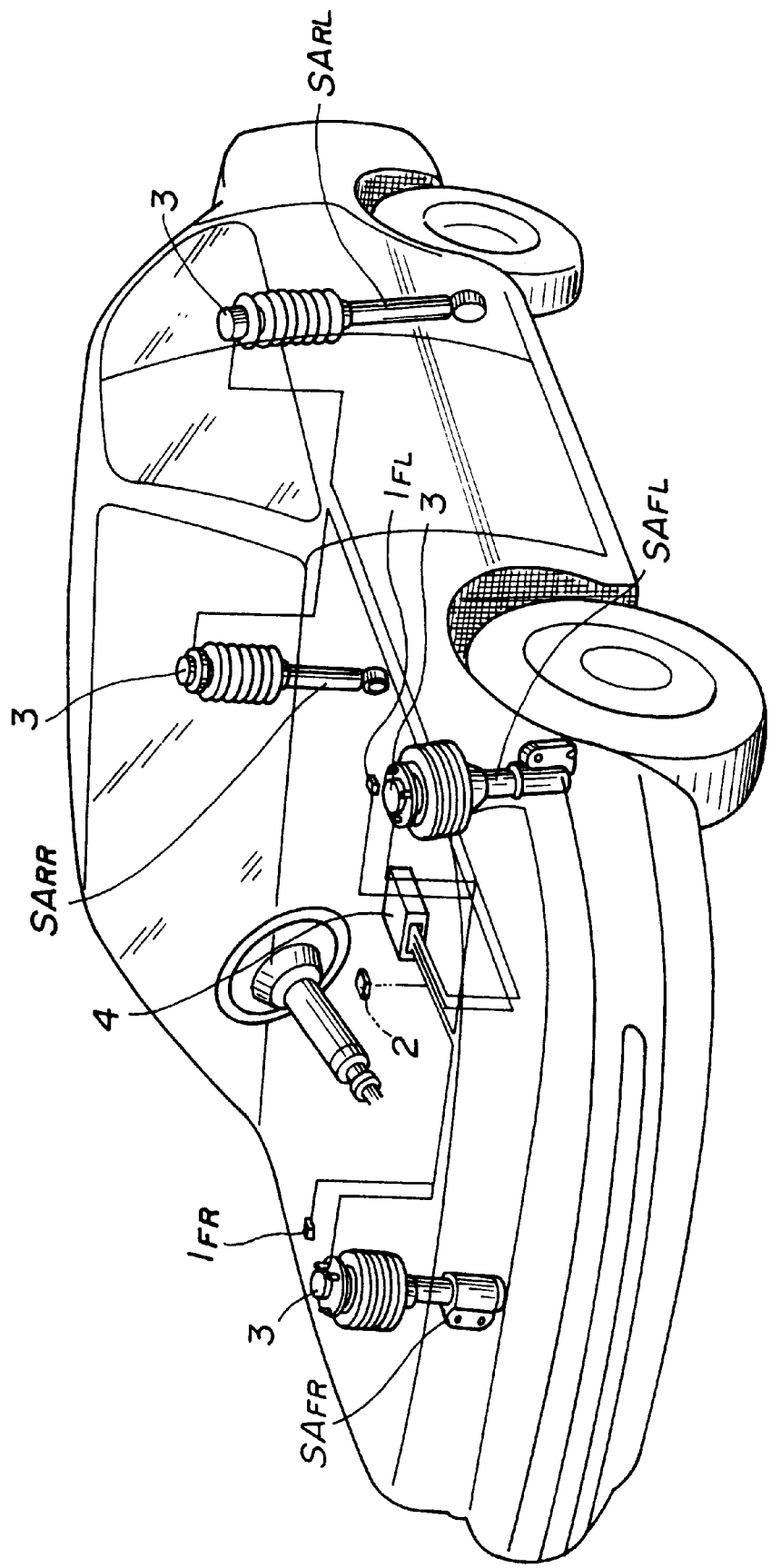
FIG. 38 is an explanatory view of the damping force characteristic controlling apparatus in an eighth preferred embodiment.
Figure 39:
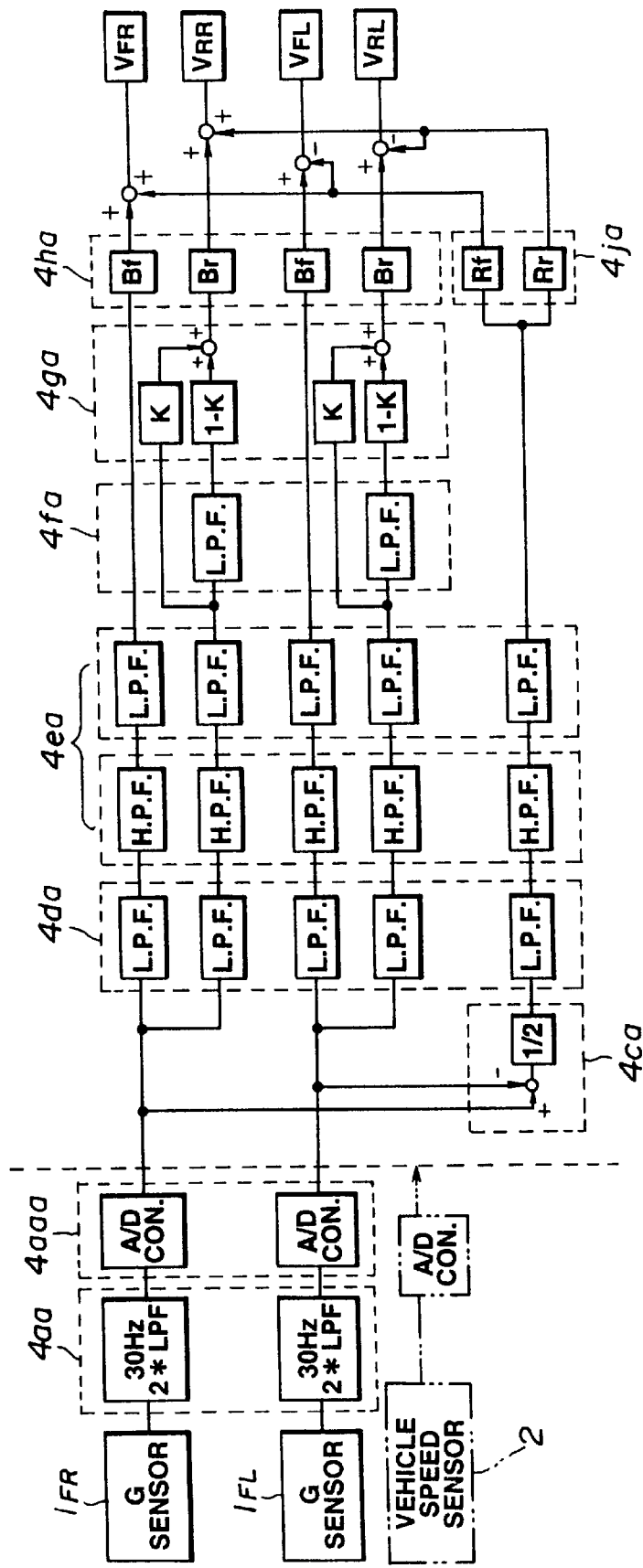
FIG. 39 is a schematic circuit block diagram of the damping force characteristic controlling apparatus in the eighth embodiment.

FIGS. 38 and 39 show an eighth preferred embodiment of the damping force characteristic controlling apparatus according to the present invention.

The arrangement of the damping force characteristic controlling apparatus shown in FIG. 38 is the same as that in the first embodiment shown in FIG. 2 but in the eighth embodiment the vehicle speed sensor 2 is provided for detecting the vehicle speed and the vehicle speed indicative signal is supplied to the control unit via an A/D converter.

Figure 40:
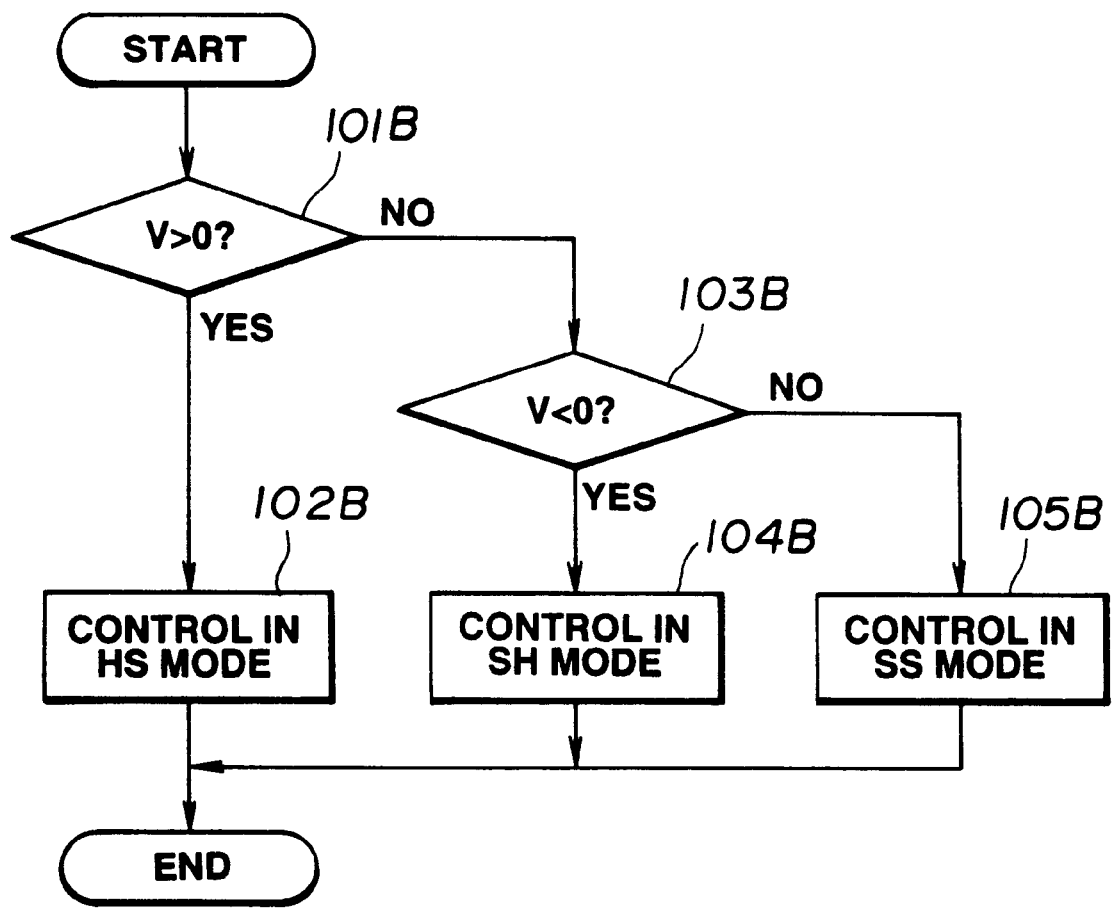
FIG. 40 is an operational flowchart representing a damping force characteristic controlling routine in the case of the eighth embodiment.

FIG. 40 shows the operational flowchart for controlling the damping force characteristics of the respective shock absorbers SA ($SA_{FR}$ through $SA_{RR}$).

It is noted that the control routine shown in FIG. 40 is generally the same as shown in FIG. 17 but the values of the predetermined thresholds are zeroes at steps of 101B and 103B in the case of FIG. 40.

It is noted that at a step 105B the CPU 4b issues the command to the driver to control the respective shock absorbers SA in the soft regions SS (both extension and compression strokes are soft damping force characteristics) since the control signal(s) indicates zero.

FIGS. 41A through 41E show timing charts of the respective signals and drives in the corresponding one of the stepping motors 3.

Figure 41A:
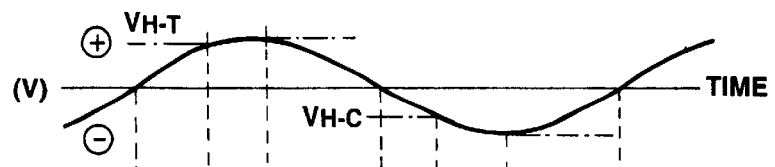
FIGS. 41A through 41E are integrally a timing chart of the damping force characteristic control operation in the case of the eighth embodiment.
Figure 41B:
Figure 41C:
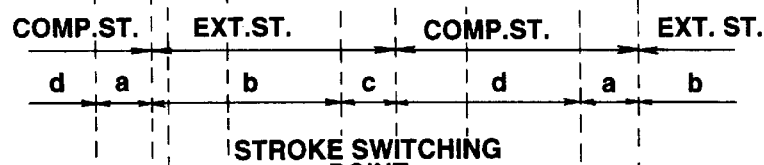

If the control signal V based on the sprung mass velocity signal is varied as shown in FIG. 41A, the corresponding shock absorber SA is controlled in the SS region mode.

When the control signal V indicates the positive value, the shock absorber SA is controlled in the extension stroke side hard region and the compression stroke side is controlled in the soft region (so called, HS region mode). At this time, the damping force characteristic at the extension stroke side is varied in proportion to the control signal V.

That is to say, a target damping force characteristic exhibiting position P is calculated on the basis of the following equation.

$$P=(V/V_{H-T}) \times P_{Tmax} \qquad (10).$$

In the equation (10), $V_{H-T}$ denotes a proportional range at the extension stroke side and its value is updated to the value of the control signal V when the value of the control signal V exceeds the value of the proportional range $V_{H-T}$ so that the target damping force characteristic exhibiting position P is started to be reduced at a time point where the control signal V is folded from its peak value and $P_{Tmax}$ denotes a maximum (hardest) damping force characteristic exhibiting position at the extension stroke side.

Then, when the control signal V indicates the negative value, the shock absorber SA is controlled in the compression hard region SH (extension stroke side is soft and the compression stroke side is hard) mode.

While the extension stoke side is fixed to the low damping force characteristic, the damping force characteristic at the compression stroke side is varied in proportion to the control signal V.

At this time, a target damping force position P is derived on the basis of the following equation (11).

$$P=(V/V_{H-C}) \times P_{Cmax} \qquad (11).$$

In the equation (11), $V_{H-T}$ denotes the proportional range at the compression stroke side and its value is updated to the value of the control signal V when the value of the control signal V exceeds negatively the value of the proportional range $V_{H-T}$ and $PC_{max}$ denotes a maximum damping force exhibiting position at the compression stroke side.

In the eighth embodiment, when both of the control signal (sprung mass vertical velocity) V and relative velocity between the sprung mass and unsprung mass have the equal signs (+ and +, − and −) (regions b and d of FIG. 41C), one of the extension and compression stroke sides of the shock absorber SA is controlled in the hard characteristic.

When both of them described above have different signs (+ and −, − and +) (regions a and c of FIG. 41C), one of the extension and compression stroke sides of the shock absorber SA is controlled in the soft characteristic. Thus, the same control as the damping force characteristic control based on the sky hook theory can be carried out only by means of the pair of front left and right road wheel side sprung mass acceleration sensors $I_{FL}$ and $I_{FR}$.

Figure 41D:
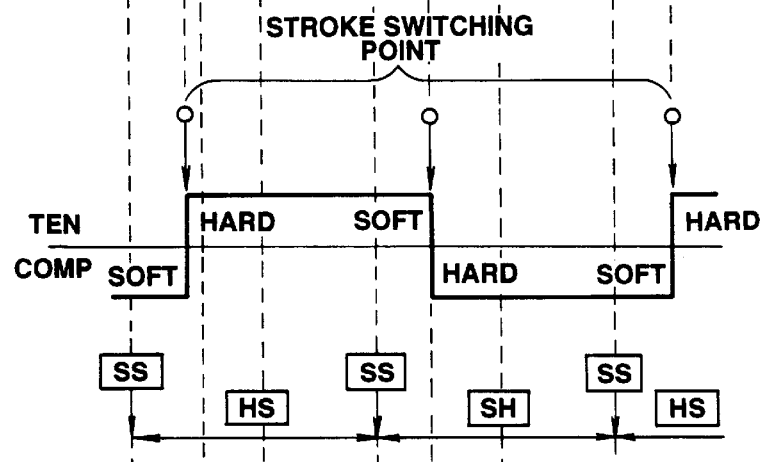
Figure 41E:
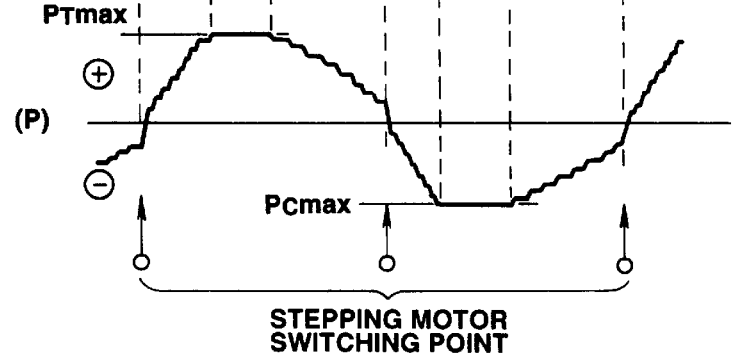

As shown in FIGS. 41D and 41E, when the region is transferred from the region a to the region b and from the region c to the region d, the switchings of the damping force characteristics can be carried out without drives to the corresponding one of the stepping motors 3.

Next, referring back to FIG. 39, the generations of the control signals V ($V_{FL}$, $V_{FR}$, $V_{RL}$, and $V_{RR}$) will be described below.

The control unit 4 includes the noise elimination block 4aa; A/D conversion block 4aaa; a rolling component calculating block 4ca; a velocity conversion block 4da which is so constructed as to convert the digital sprung mass vertical acceleration signal to the corresponding sprung mass vertical velocity signal; a control signal range setting block 4e which is so constructed as to eliminate unnecessary frequency regions; a preview signal forming block 4fa; a phase synthesis block 4ga; and a bouncing gain setting block 4h; and a rolling gain setting block 4ja.

As shown in FIG. 39, both of the sprung mass vertical acceleration signals $G_{FL}$ and $G_{FR}$ input from the pair of the sprung mass vertical acceleration sensors $I_{FL}$ and $I_{FR}$ are passed through the noise elimination block 4aa and the A/D conversion block 4aaa and are calculated to derive the vehicular rolling component signal $V_R$, the rolling component signal $V_R$ being processed by means of the speed conversion block 4da and control range setting block 4ea. Thereafter, the rolling gain setting block 4ja multiplies either of front road wheel side rolling gain $R_f$ or rear road wheel side rolling gain $R_r$ by the passed signal from the control range setting block 4ea to derive a front road wheel side rolling rate ($V_R \cdot R_f$) or rear road wheel side rolling rate ($V_R \cdot R_r$)

For the front left and right road wheel side control signals $V_{FL}$ and $V_{FR}$, the respective sprung mass vertical acceleration signals $G_{FL}$ and $G_{FR}$ input from the respective sprung mass acceleration sensors $I_{FR}$ and $I_{FL}$ are processed through the noise elimination block 4aa, the A/D conversion block 4aaa, the velocity speed conversion block 4da, and the control range setting block 4ea to derive the front left and right road wheel side bouncing component signal $FLV_B$, $FRV_B$. Thereafter, the front left and right road wheel side bouncing component signals $FLV_B$ and $FRV_B$ are supplied to the bouncing gain setting block 4ha which are so constructed as to multiply them by the front road side bouncing gain $B_f$ to derive front left road wheel side bouncing rate ($FLV_B \cdot B_f$) and front right road wheel side bouncing rate ($FRV_B \cdot B_f$). Thereafter, the front road left and right wheel side control signals $V_{FL}$ and $V_{FR}$ are derived with the derived front road wheel side rolling rate ($V_R \cdot R_f$) taken into account as follows:

Front right road wheel side:

$$V_{FR} = FRV_B \cdot B_f + V_R \cdot R_f,$$

Front left road wheel side:

$$V_{FL} = FLV_B \cdot B_f - V_R \cdot R_f \qquad (12).$$

As shown in FIG. 39, the preview signal forming block 4fa prepares front left and right preview signals $FLV_{-L}$ and $FLV_{-L}$ whose phases are delayed with respect to those of the front left and right bouncing component signals $FLV_B$ and $FRV_B$.

The phase synthesis block 4ga derives left and right synthesized bouncing component signals $RLV_{B-L}$ (=$K \cdot FLV_B + (1-K) \cdot FLV_{-L}$) and $RRV_{B-L}$ (=$K \cdot FRV_B + (1-K) \cdot FRV_{-L}$) by synthesizing the corresponding left and right preview signals $FLV_{-L}$ and $FRV_{-L}$ with the front left and right road wheel side bouncing component signals $FLV_B$ and $FRV_B$ at a predetermined ratio $\{(1-K): K\}$, respectively. The symbol K denotes a weight coefficient and is shown in FIG. 42.

Figure 42:
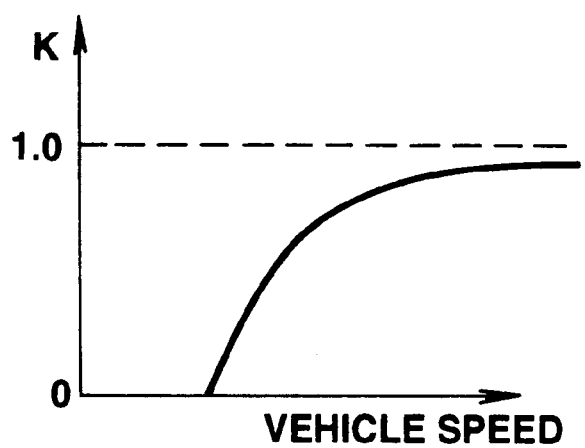
FIG. 42 is a function map of a value of weighting coefficient K determining a ratio of synthesis in a signal synthesizing circuit in the eighth embodiment.

As shown in FIG. 42, the coefficient K is the function of the vehicle speed and indicates zero until the vehicle speed is increased and exceeds a predetermined vehicle speed (except zero speed). The weight(ing) coefficient K is gradually increased and approached to one (K=1.0) when the vehicle speed exceeds the predetermined value.

That is to say, the front road wheel side bouncing components $FLV_B$ and $FRV_B$ are increased in proportion to the vehicle speed and when the weighting coefficient K indicates generally one (the vehicle speed gives the maximum), the front road wheel side bouncing components $FLV_B$ and $FRV_B$ provide directly the signal synthesized bouncing component signals $RLV_{B-L}$ and $RRV_{B-L}$, respectively. It is noted that if the vehicle speed is reduced and does not indicate the value exceeding the predetermined value shown in FIG. 42, the values of the preview signals $FLV_{-L}$ and $FRV_{-L}$ provide directly the left and right signal synthesized bouncing component signals $RLVB_{B-L}$ and $RRV_{B-L}$.

Thereafter, rear left and right road wheel side bouncing rates ($RLV_{B-L} \cdot B_r$) and ($RRV_{B-L} \cdot B_r$) are derived by multiplying the left and right signal synthesized bouncing components $FLV_{B-L}$ and $RRV_{B-L}$ by rear road wheel side bouncing gain $B_r$ at the bouncing gain setting block 4ha.

Consequently, the rear left and right road wheel side control signals $V_{RL}$ and $V_{RR}$ are derived using the rear left and right road wheel side rolling rate ($V_R \cdot R_r$) and bouncing rates ($RLV_{B-L} \cdot Br$) and ($RRV_{B-L} \cdot Br$) as follows:

Rear right road wheel side:

$$V_{RR} = RRV_{B-L} \cdot Br + V_R \cdot Rr,$$

Rear left road wheel side:

$$V_{RL} = RLV_{B-L} \cdot Br - V_R \cdot Rr \qquad (13).$$

FIGS. 43A through 43D show signal timing charts representing phase relationships between the actually measured value of the sprung mass vertical velocity at the position of the rear road wheel side, the front road wheel side bouncing component signal $FLV_B$ ($FRV_B$), the preview signal $FLV_{-L}$ ($FRV_{-L}$), and signal synthesized component signal $RLV_{B-L}$ ($RRV_{B-L}$)

As shown in FIGS. 43A through 43D, the phase of the front road wheel side bouncing component signal $FLV_B$ ($FRV_B$) is advanced to that of the actually measured value of the sprung mass vertical velocity at the rear road wheel sides. Therefore, the preview signal forming block 4fa forms the preview signal $FLV_{-L}$ ($FRV_{-L}$) whose phase is further retarded to the actually measured value of the sprung mass vertical velocity at the rear road wheel position and the phase synthesizing block 4ga synthesizes the predetermined ratio ((1−K): K) of the phase delayed preview signal $FLV_{-L}$ ($FRV_{-L}$) with the phase advanced front road wheel side bouncing component signal $FLV_B$ ($FRV_B$), thus deriving the signal phase synthesized bouncing component signal $RLV_{B-L}$ ($RRV_{B-L}$) which is in phase with the actually measured value of the sprung mass vertical velocity at the rear road wheel sides.

Figure 44:
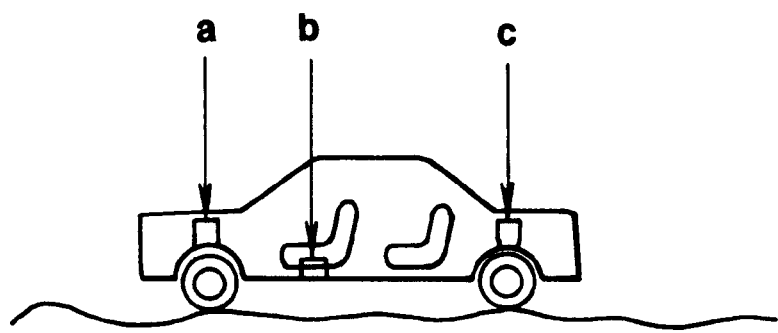
FIG. 44 is a schematic side view of the vehicle in which the vertical acceleration sensors are mounted in the case of the eighth embodiment shown in FIGS. 39 through 43B.

FIG. 44 shows a schematic right side view of the vehicle and shows a front tower position a, front occupant seat position b, and a rear tower position c.

The front tower position a is generally defined as a position of the vehicular body above the front tire tread, the front occupant seat position b is generally defined as the position of the vehicular body above the front occupant seat, and the rear tower position c is generally defined as the position of the vehicular body above the rear tread.

Figure 45A:
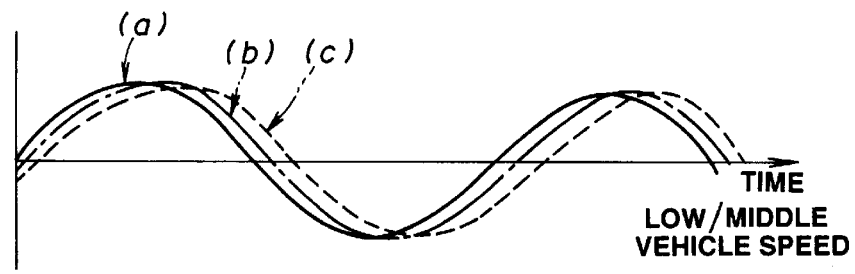
FIGS. 45A and 45B are signal timing charts representing phase relationships between the respective sprung mass vertical velocity signals detected and output at the sensor mounted parts of the vehicular body shown in FIG. 44, FIG. 45A being the case where the vehicle speed falls in a middle or low speed region and FIG. 45B being the case where the vehicle speed falls in a high speed region.
Figure 45B:
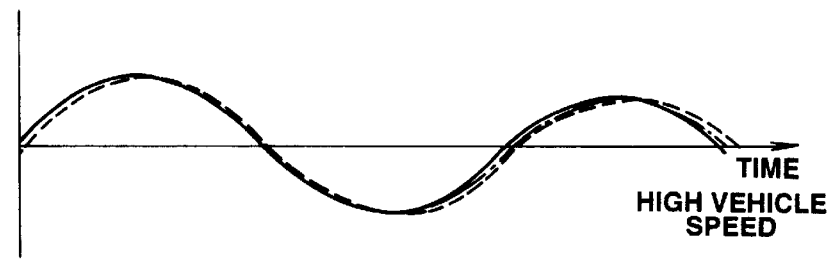

FIGS. 45A and 45B show the phase relationships between the sprung mass vertical velocity signal (a) detected at the front tower position a of FIG. 44, the sprung mass vertical velocity signal (b) detected at the front occupant seat position b of FIG. 44, and the sprung mass vertical velocity signal (c) detected at the rear tower position c of FIG. 44.

As shown in FIG. 45A, it is appreciated that as the position of the vehicular body goes rear, the phase tends to be delayed.

In addition, as shown in FIG. 45A, when the vehicle speed indicates a value falling in a low speed region or middle speed region, mutual phase differences between the respective velocity signals indicate relatively large.

On the other hand, as shown in FIG. 45B, when the vehicle speed indicates a value falling in a relatively high speed region, the mutual phase differences between the respective velocity signals indicate relatively small.

Figure 46:
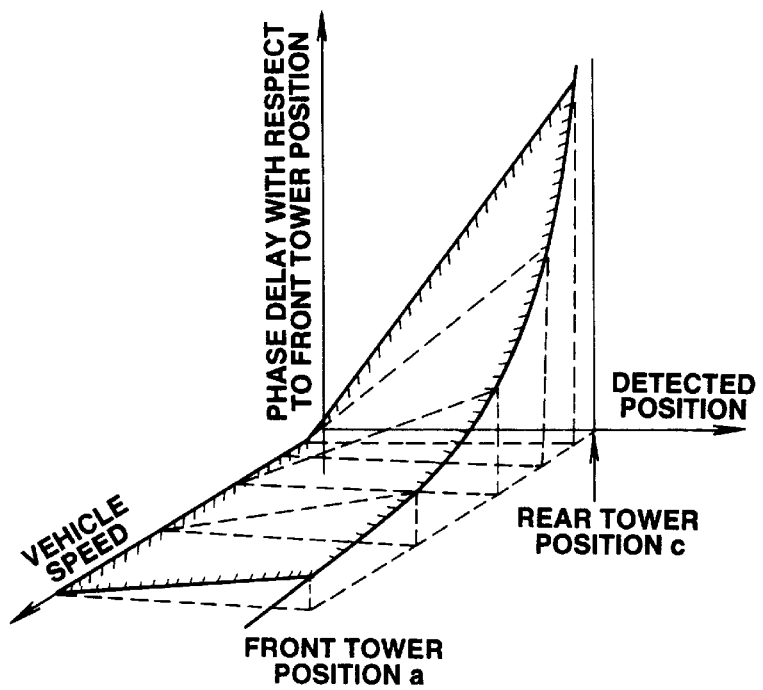
FIG. 46 is a three-dimensional characteristic graph representing phase differences between the respective sprung mass vertical velocity signals detected and output from the respective sprung mass vertical velocity determining circuits located at the respective positions of the vehicular body shown in FIG. 44.

FIG. 46 shows characteristic graphs of the phase relationships at the positions of the vehicular body on which the sprung mass vertical acceleration sensors are to be mounted with the road surface input frequency constant.

As appreciated from FIG. 46, the phase of the sprung mass vertical velocity signal becomes proportionally retarded (delayed) when the detected position is moved from the front tower position to the rear tower position and the phase difference between the sprung mass vertical velocity signals at the respectively detected positions becomes smaller as the vehicle speed increases.

Then, the weighting coefficient K which determines the predetermined synthesis ratio ((1−K): K) is given as the function of the vehicle speed such that as the vehicle speed increases the ratio of synthesis to the front road wheel side bouncing component signal $FLV_B$ and $FRV_B$ is increased and that to the preview signal $FLV_{-L}$ ($FRV_{-L}$) is reduced. Thus, whichever the vehicle speed indicates, the phase matching can accurately be made.

Next, an action of the eighth embodiment will be described below.

(1) Low/middle speed running:

FIGS. 47A through 47D show respective signals of the control signals and so forth.

When the vehicle speed value indicates the value falling in the relatively low and middle speed regions, the rear road wheel side control signals $V_{RL}$ and $V_{RR}$ can be derived on the basis of the phase synthesized bouncing component signals $RLV_{B-L}$ and $RRV_{B-L}$ synthesized at the predetermined ratio of the front road wheel side bouncing component signals $FLV_B$ and $FRV_B$ and preview signals $FLV_{-L}$ and $FRV_{-L}$.

Hence, when the vehicle speed indicates the low/middle speed range, it is possible to perform the preview control for the rear road wheel side shock absorbers $SA_{RL}$ and $SA_{RR}$ with the behaviors at the rear road wheel side vehicular body simultaneously generated when the road input occurs at the front road wheel side vehicular body, thus accurate and appropriate damping force characteristic controls for the rear road wheel side actual behaviors can be achieved.

Figures 48A, 48B:
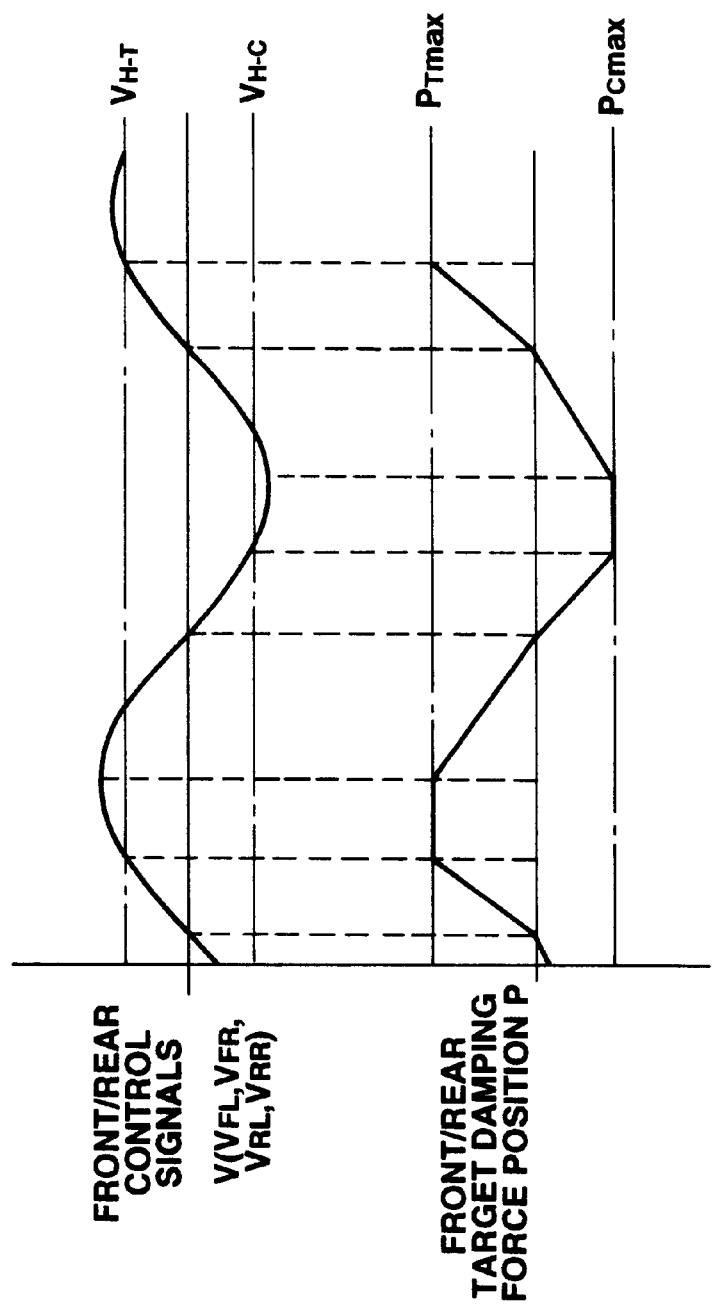
FIGS. 48A and 48B are signal timing charts representing relationships between the front/ rear road wheel side control signals and the front/rear road wheel side target damping force positions when the vehicle speed falls in the high speed range.

(2) High speed running:

On the other hand, FIGS. 48A and 48B show the control signals V ($V_{FL}$, $V_{FR}$, $V_{RL}$, and $V_{RR}$) and target damping force characteristic exhibiting position P, when the vehicle speed increases and exceeds the predetermined speed value.

When the vehicle speed indicates the value falling in the high speed region, the vehicular body behavior becomes in the bouncing motion mode. At this time, since the phase synthesis ratio to the preview signals $FLV_{-L}$ and $FRV_{-L}$ can be set generally to zeroes, the rear left and right road wheel side control signals $V_{RL}$ and $V_{RR}$ give approximately equal to the front left and right road wheel side control signals $V_{FL}$ and $V_{FR}$, respectively.

Hence, the bouncing motion of the vehicular body when the vehicle runs at the high speed can effectively be suppressed.

FIGS. 49A through 49D show the front road wheel side control signal ①, the rear road wheel side control signal ②, and actually measured value ③ of the vertical behavior (velocity) at the rear tower position c, when the vehicle in which the damping force characteristic controlling apparatus in the eighth embodiment is installed has actually run on a road surface on which a single recess and convex is formed (impulse input).

Figure 49A:
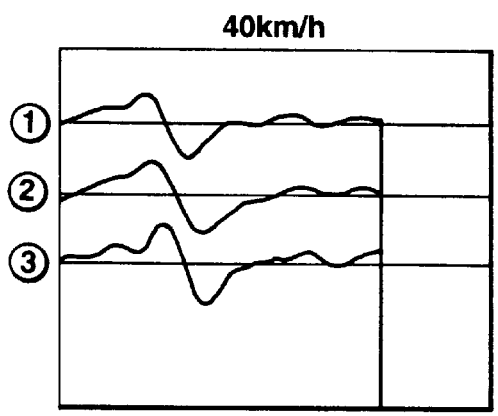
FIGS. 49A through 49D are signal timing charts of the front road wheel side control signals, rear road wheel side control signals, and actually measured values of the sprung mass vertical velocity signal derived at a rear tower position in an actual test of running the vehicle on a impulse road surface, FIG. 49A being those in the state where the vehicle runs at 40 Km/h, FIG. 49B being those in the state where the vehicle runs at 50 Km/h, FIG. 49C being those in the state where the vehicle runs at 70 Km/h, and FIG. 49D being those in the state where the vehicle runs at 100 Km/h.
Figure 49B:
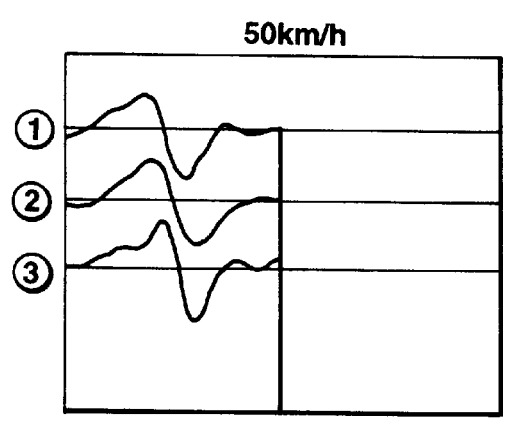
Figure 49C:
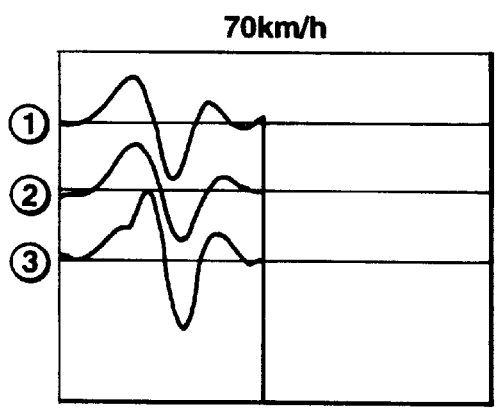
Figure 49D:
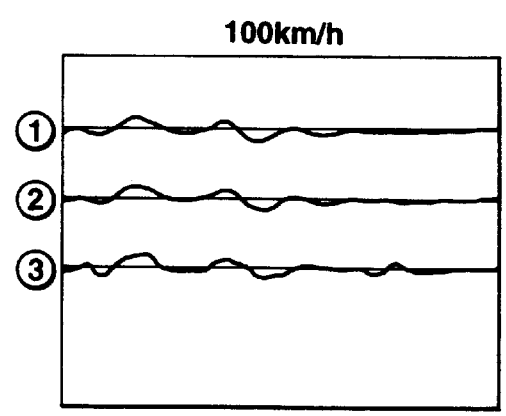

In FIG. 49A, the actual vehicle speed is about 40 Km/h. In FIG. 49B, the actual vehicle speed is about 50 Km/h. In FIG. 49C, the actual vehicle speed is about 70 Km/h. In FIG. 49D, the actual vehicle speed is about 100 Km/h. In the actual test shown in FIGS. 49A, 49B, 49C, and 49D, the low pass filter having the cut-off frequency of 0.8 Hz and the gain of 1.6 (gain at the frequency of 1.0 Hz) was used. The phase relationships between these signals shown in FIGS. 49A through 49D are appreciated from those shown in FIGS. 49A through 49D.

The eighth embodiment has the following advantages:

(1) The rear road wheel side control signals $V_{RL}$ and $V_{RR}$ are formed on the basis of the phase synthesized bouncing component signals $RLV_{B-L}$ and $RRV_{B-L}$ to which the front road wheel side sprung mass vertical behavior signals (front road wheel side bouncing component signals $FLV_B$ and $FRV_B$) are added not only the preview signals ($FLV_{-L}$, $FRV_{-L}$), it is possible to perform the preview control with the rear road wheel side behaviors generated simultaneously when the road input occurs at the front road wheel side taken into consideration so that the accurate and appropriate damping force characteristic controls for the rear road wheel side shock absorbers to the rear road wheel actual behaviors can be made.

(2) In addition, with the phase advance quantity of the front road wheel side sprung mass behavior signal with respect to the sprung mass behavior signals at the rear left and right road wheel side vehicular body being smaller as the vehicle speed indicates a higher speed value in mind, the ratio of synthesis between the phase advanced front road wheel side sprung mass vertical behavior signal(s) (front road wheel side bouncing component signals $FLV_B$ and $FRV_B$) and the phase delayed preview signal(s) ($FLV_{-L}$ and $FRV_{-L}$) is varied according to the vehicle speed. Thus, even if the vehicle speed is varied, the phases of the front road wheel side control signals can be matched to the phases of the actual behaviors at the rear left and right road wheel side vehicular body.

(3) As compared with the damping force characteristic control based on the previously proposed sky hook theory, the number of switchings of the damping force characteristics are reduced so that the control responsive characteristics can be improved and the higher durabilities of the respective stepping motors 3 and reductions in the consumed power thereat can be achieved.

(4) The modifications in the eighth embodiment are generally the same as those in the first embodiment.

For example, relative displacement and/or relative velocity detecting means (weight sensors) may be installed in place of the sprung mass vertical acceleration sensors.

For example, only a single sprung mass vertical acceleration sensor as shown in FIG. 20 may be installed in the case of the eighth embodiment.

Various types of embodiments and modifications can be made within the scope of the present invention which will be defined by the appended claims.

What is claimed is:

1. An apparatus for an automotive vehicle having a vehicular body, comprising:
   a) front left, front right, rear left, and rear right road wheel shock absorbers, each shock absorber being positioned on the vehicular body adjacent a corresponding one of front left and front right and rear left and rear right road wheels and being constructed and arranged so that a damping force characteristic of said each shock absorber can be changed during an extension or compression phase of a piston installed therein;
   b) a damping force characteristic changing unit, responsive to an input drive signal, for changing the damping force characteristic of a corresponding one of the respective shock absorbers;
   c) a vehicular vertical behavior determining unit for determining a vehicular vertical behavior at a first position of the vehicular body, the first position being located forward by a predetermined distance from the rear left and rear right road wheel shock absorbers, and for outputting a vehicular vertical behavior signal according to the determined vehicular vertical behavior at the first position;
   d) a filter processed signal forming unit for forming a processed signal having a frequency dependent characteristic by filtering said vehicular vertical behavior signal; and
   e) a damping force characteristic control unit for forming a control signal for each one of the respective shock absorbers on the basis of the processed signal and for outputting the input drive signal according to a value of the formed control signal to said damping force characteristic changing unit so as to control the damping force characteristic of said each one of the respective shock absorbers, wherein control signals for the rear left and rear right road wheels have phases generally matching phases of vehicular behavior velocity signals which would be generated at the rear left and rear right road wheels if vehicular vertical behavior determining units were located adjacent to the rear left and rear right road wheels, wherein said vehicular vertical behavior determining unit comprises a front road wheel vehicular behavior detecting unit for detecting a vehicular vertical behavior at the front road wheels and outputting a front road wheel vehicular vertical behavior signal, and a rear road wheel vehicular behavior detecting unit for detecting a vehicular vertical behavior at said first position and outputting the vehicular vertical behavior signal, wherein said rear road wheel vehicular vertical behavior detecting unit comprises a vehicular vertical behavior sensor located near a center axis of the roar road wheels and a calculating unit for calculating the vehicular vertical behavior signal at the first position an the basis of the rear road wheel vehicular vertical behavior signal supplied by said vehicular vertical behavior sensor and front road wheel vehicular vertical behavior signal supplied by solid front road wheel vehicular vertical behavior detecting unit, said apparatus further comprising:
   a vehicle speed sensor which is constructed so as to produce and output a signal indicative of a vertical vehicle speed and wherein said first position is assumed to have moved further forward by a distance which is proportional to the vehicle speed and said calculating unit calculates the vertical behavior signal at the assumed first position, wherein said calculating unit calculates the front road wheel side sprung mass vertical accelerations (G'fL, G'fR) at the front road wheel positions and the rear road wheel side sprung mass vertical accelerations (G'rL, G'rR) at the forward position from the rear road wheel position by a distance (y) on the basis of the following equations:

$$G'fl = x(L_1-L_2)/(L_0 \pm L_1) \pm GFR + (1+(L_2 \pm x)/(L_0 \pm L_1)) \pm GFL - x/L_0 \pm GRR;$$

$$G'fr = (1+(L_1-L_2)/(L_0 \pm L_1) \pm x) \pm GFR + ((L_2 \pm x)/(L_0 \pm L_1)) \pm GFL - x/L_0 \pm GRR;$$

$$G'rL = (L_1-L_2) \pm (L_0-y)/(L_0 \pm L_1) \pm GFR + (y \pm L_1 + (L_1-L_2) \pm (L_0-y))/(L_0 \pm L_1) \pm GFL + (L_0-y)/L_0 \pm GRR;$$

$$G'rR = ((L_1-L_2) \pm y + L_2 \pm L_0)/(L_0 \pm L_1) \pm GFR + L_2(L_0-y)/(L_0 \pm L_1) \pm GFL + (L_0-y)/L_0 \pm GRR,$$

wherein L0 denotes a wheel base distance L1 denotes a distance between center points of contact with the ground of either the front right and front left road wheels or the rear right and rear left road wheels, L2 denotes a deviation width of the arranged position of the sprung mass vertical acceleration sensor (1RR) with respect to the position of the rear right road wheel (RR) in at widthwise direction of the vehicle, and x and y are first order functions of the vehicle speed, and wherein x=Kf±(speed)+xO and y=Kr±(speed)+y0, wherein Kf and Kr denote gains, (speed) denotes a speed value of the vehicle speed indicative signal, and x0 and y0 denote initial values of x and y, respectively.

2. An apparatus for an automotive vehicle as set forth in claim 1, wherein said vehicular vertical behavior determining unit comprises a single vehicular body sprung mass acceleration sensor which is located approximately midway between the front left and front right road wheels and wherein said filter processed signal forming unit forms the processed signal by filtering the vehicular body sprung mass vertical acceleration signal of the single vehicular body vertical sprung mass acceleration sensor.

3. An apparatus for an automotive vehicle as set forth in claim 2, further comprising a vehicle speed sensor which is constructed so as to produce and output a vehicle speed signal indicative of a vertical vehicle speed and wherein said filter processed signal forming unit comprises a plurality of filters having different phase characteristics, said filters being selected to adjust phases and gains of the control signal depending on the vehicle speed.

4. An apparatus for an automotive vehicle as set forth in claim 2, further comprising:
   f) a second vehicular vertical behavior determining unit for determining a vehicular vertical behavior at the rear road wheels and outputting a second vehicular vertical behavior signal;
   g) a vehicle speed sensor which is constructed to produce and output a vehicle speed indicative signal; and
   h) a vehicle speed determining unit for determining whether the present vehicle speed exceeds a predetermined speed value,
   wherein said damping force characteristic control unit controls the damping force characteristics of the rear left and rear road wheel shock absorbers mainly according to the control signals formed on the basis of the processed signals, when said speed determining unit determines that the present vehicle speed is increasing and exceeds the predetermined speed value and controls the damping force characteristics of the rear left and rear road wheel shock absorbers on the basis of said second vehicular vertical behavior signal, when said speed determining unit determines that the present vehicle speed is decreasing and does not exceed the predetermined speed value.

5. An apparatus for an automotive vehicle as set forth in claim 1,
   wherein said filter processed signal forming unit forms the processed signal by filtering the vehicular vertical behavior indicative signal of the rear road wheel vehicular vertical behavior detecting unit, and
   wherein said damping force characteristic control unit comprises a front road wheel control unit for controlling the damping force characteristics of the front left and front right road wheel shock absorbers according to the control signal based on the front road wheel vehicular vertical behavior signal and rear road wheel control units for controlling damping force characteristics of the rear left and rear right road wheel shock absorbers according to the control signal formed on the basis of the processed signal.

6. An apparatus for an automotive vehicle as set forth in claim 5, wherein said rear road wheel vehicular vertical behavior detecting unit comprises a vertical acceleration sensor which is installed at the first position.

* * * * *